United States Patent
Wang et al.

(10) Patent No.: US 7,920,753 B2
(45) Date of Patent: Apr. 5, 2011

(54) PREPROCESSING FOR INFORMATION PATTERN ANALYSIS

(75) Inventors: Jian Wang, Beijing (CN); Liyong Chen, Beijing (CN); Yingnong Dang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/138,339

(22) Filed: Jun. 12, 2008

(65) Prior Publication Data

US 2009/0067743 A1 Mar. 12, 2009

Related U.S. Application Data

(62) Division of application No. 11/138,959, filed on May 25, 2005, now Pat. No. 7,400,777.

(51) Int. Cl.
*G06K 9/36* (2006.01)
(52) U.S. Cl. .................. 382/254; 382/274; 382/275
(58) Field of Classification Search .............. 382/260, 382/274, 275; 358/3.26, 3.27, 463
See application file for complete search history.

(56) References Cited

U.S. PATENT DOCUMENTS

| | | | |
|---|---|---|---|
| 4,686,329 A | 8/1987 | Joyce | |
| 4,742,558 A | 5/1988 | Ishibashi et al. | |
| 4,745,269 A | 5/1988 | Van Gils et al. | |
| 4,829,583 A | 5/1989 | Monroe et al. | |
| 4,941,124 A | 7/1990 | Skinner, Jr. | |
| 5,032,924 A | 7/1991 | Brown et al. | |
| 5,051,736 A | 9/1991 | Bennett et al. | |
| 5,073,966 A | 12/1991 | Sato et al. | |
| 5,146,552 A | 9/1992 | Cassorla et al. | |
| 5,153,928 A | 10/1992 | Iizuka | |
| 5,181,257 A | 1/1993 | Steiner et al. | |
| 5,196,875 A | 3/1993 | Stuckler | |
| 5,235,654 A | 8/1993 | Anderson et al. | |
| 5,243,149 A | 9/1993 | Comerford et al. | |
| 5,247,137 A | 9/1993 | Epperson | |
| 5,253,336 A | 10/1993 | Yamada | |
| 5,280,289 A * | 1/1994 | Root | ............... 342/91 |
| 5,288,986 A | 2/1994 | Pine et al. | |

(Continued)

FOREIGN PATENT DOCUMENTS

CN 1303494 7/2001

(Continued)

OTHER PUBLICATIONS

U.S. Appl. No. 10/849,249, Wang.

(Continued)

*Primary Examiner* — Yosef Kassa
(74) *Attorney, Agent, or Firm* — Perkins Coie LLP

(57) ABSTRACT

Pre-processing techniques for processing an image to improve the distinctiveness of an information pattern captured in the image before the information pattern is analyzed in a decoding process. The brightness of an image first is normalized by dividing the image into blocks of areas, such as pixels. A brightness distribution value then is determined for each area of the image by fitting the brightness of its surrounding blocks using bilinear interpolation and extrapolation, and a normalized brightness value for each area can then be obtained by dividing the original brightness value by the brightness distribution value. Next, masks are created to distinguish the information pattern from content captured in the image. The masks may be generated based upon contrast differences between the brightness of pixels representing the information pattern, the brightness of pixels representing content, and the brightness of pixels representing the background of the writing medium.

12 Claims, 19 Drawing Sheets

U.S. PATENT DOCUMENTS

| | | | |
|---|---|---|---|
| 5,294,792 A | 3/1994 | Lewis et al. | |
| 5,335,150 A | 8/1994 | Huang | |
| 5,365,598 A | 11/1994 | Sklarew | |
| 5,394,487 A | 2/1995 | Burger et al. | |
| 5,398,082 A | 3/1995 | Henderson et al. | |
| 5,414,227 A | 5/1995 | Schubert et al. | |
| 5,414,538 A * | 5/1995 | Eschbach | 358/522 |
| 5,442,147 A | 8/1995 | Burns et al. | |
| 5,448,372 A | 9/1995 | Axman et al. | |
| 5,450,603 A | 9/1995 | Davies | |
| 5,454,054 A | 9/1995 | Iizuka | |
| 5,471,533 A | 11/1995 | Wang et al. | |
| 5,477,012 A | 12/1995 | Sekendur | |
| 5,511,156 A | 4/1996 | Nagasaka | |
| 5,546,515 A | 8/1996 | Mochizuki et al. | |
| 5,581,637 A | 12/1996 | Cass et al. | |
| 5,581,682 A | 12/1996 | Anderson et al. | |
| 5,587,558 A | 12/1996 | Matsushima et al. | |
| 5,612,524 A | 3/1997 | Sant'Anselmo et al. | |
| 5,626,620 A | 5/1997 | Kieval et al. | |
| 5,629,499 A | 5/1997 | Flickinger et al. | |
| 5,635,697 A | 6/1997 | Shellhammer et al. | |
| 5,644,652 A | 7/1997 | Bellegarda et al. | |
| 5,652,412 A | 7/1997 | Lazzouni et al. | |
| 5,661,291 A | 8/1997 | Ahearn et al. | |
| 5,661,506 A | 8/1997 | Lazzouni et al. | |
| 5,670,897 A | 9/1997 | Kean | |
| 5,686,718 A | 11/1997 | Iwai et al. | |
| 5,692,073 A | 11/1997 | Cass | |
| 5,719,884 A | 2/1998 | Roth et al. | |
| 5,721,940 A | 2/1998 | Luther et al. | |
| 5,726,435 A | 3/1998 | Hara et al. | |
| 5,727,098 A | 3/1998 | Jacobson | |
| 5,748,808 A | 5/1998 | Taguchi et al. | |
| 5,754,280 A | 5/1998 | Kato et al. | |
| 5,756,981 A | 5/1998 | Roustaei et al. | |
| 5,765,176 A | 6/1998 | Bloomberg | |
| 5,774,602 A | 6/1998 | Taguchi et al. | |
| 5,817,992 A | 10/1998 | D'Antonio | |
| 5,818,436 A | 10/1998 | Imai et al. | |
| 5,822,436 A | 10/1998 | Rhoads | |
| 5,822,465 A | 10/1998 | Normile et al. | |
| 5,825,015 A | 10/1998 | Chan et al. | |
| 5,825,892 A | 10/1998 | Braudaway et al. | |
| 5,850,058 A | 12/1998 | Tano et al. | |
| 5,852,434 A | 12/1998 | Sekendur | |
| 5,855,483 A | 1/1999 | Collins et al. | |
| 5,855,594 A | 1/1999 | Olive et al. | |
| 5,875,264 A | 2/1999 | Carlstrom | |
| 5,890,177 A | 3/1999 | Moody et al. | |
| 5,897,648 A | 4/1999 | Henderson | |
| 5,898,166 A | 4/1999 | Fukuda et al. | |
| 5,902,968 A | 5/1999 | Sato et al. | |
| 5,937,110 A | 8/1999 | Petrie et al. | |
| 5,939,703 A | 8/1999 | Hecht et al. | |
| 5,960,124 A | 9/1999 | Taguchi et al. | |
| 5,961,571 A | 10/1999 | Gorr et al. | |
| 5,995,084 A | 11/1999 | Chan et al. | |
| 6,000,614 A | 12/1999 | Yang et al. | |
| 6,000,621 A | 12/1999 | Hecht et al. | |
| 6,000,946 A | 12/1999 | Snyders et al. | |
| 6,005,973 A | 12/1999 | Seybold et al. | |
| 6,014,462 A * | 1/2000 | Yamakawa | 382/200 |
| 6,041,335 A | 3/2000 | Merritt et al. | |
| 6,044,165 A | 3/2000 | Perona et al. | |
| 6,044,301 A | 3/2000 | Hartlaub et al. | |
| 6,052,481 A | 4/2000 | Grajski et al. | |
| 6,054,990 A | 4/2000 | Tran | |
| 6,076,734 A | 6/2000 | Dougherty et al. | |
| 6,081,261 A | 6/2000 | Wolff et al. | |
| 6,108,453 A | 8/2000 | Acharya | |
| 6,141,014 A | 10/2000 | Endo et al. | |
| 6,151,424 A | 11/2000 | Hsu | |
| 6,157,935 A | 12/2000 | Tran et al. | |
| 6,173,084 B1 * | 1/2001 | Aach et al. | 382/260 |
| 6,181,329 B1 | 1/2001 | Stork et al. | |
| 6,186,405 B1 | 2/2001 | Yoshioka | |
| 6,188,392 B1 | 2/2001 | O'Connor et al. | |
| 6,192,380 B1 | 2/2001 | Light et al. | |
| 6,202,060 B1 | 3/2001 | Tran | |
| 6,208,771 B1 | 3/2001 | Jared et al. | |
| 6,208,894 B1 | 3/2001 | Schulman et al. | |
| 6,219,149 B1 | 4/2001 | Kawata et al. | |
| 6,226,636 B1 | 5/2001 | Abdel-Mottaleb et al. | |
| 6,230,304 B1 | 5/2001 | Groeneveld et al. | |
| 6,243,071 B1 | 6/2001 | Shwarts et al. | |
| 6,249,614 B1 | 6/2001 | Kolesnik et al. | |
| 6,254,253 B1 | 7/2001 | Daum et al. | |
| 6,256,398 B1 | 7/2001 | Chang | |
| 6,259,827 B1 | 7/2001 | Nichani | |
| 6,278,968 B1 | 8/2001 | Franz et al. | |
| 6,294,775 B1 | 9/2001 | Seibel et al. | |
| 6,310,988 B1 | 10/2001 | Flores et al. | |
| 6,327,395 B1 | 12/2001 | Hecht et al. | |
| 6,330,976 B1 | 12/2001 | Dymetman et al. | |
| 6,335,727 B1 | 1/2002 | Morishita et al. | |
| 6,340,119 B2 | 1/2002 | He et al. | |
| 6,396,598 B1 | 5/2002 | Kashiwagi et al. | |
| 6,408,330 B1 | 6/2002 | DeLaHuerga | |
| 6,441,920 B1 | 8/2002 | Smith | |
| 6,479,768 B1 | 11/2002 | How | |
| 6,492,981 B1 | 12/2002 | Stork et al. | |
| 6,517,266 B2 | 2/2003 | Saund | |
| 6,522,928 B2 | 2/2003 | Whitehurst et al. | |
| 6,529,638 B1 | 3/2003 | Westerman | |
| 6,532,152 B1 | 3/2003 | White et al. | |
| 6,538,187 B2 | 3/2003 | Beigi | |
| 6,546,136 B1 | 4/2003 | Hull | |
| 6,551,357 B1 | 4/2003 | Madduri | |
| 6,558,006 B2 | 5/2003 | Ioka | |
| 6,560,741 B1 | 5/2003 | Gerety et al. | |
| 6,570,104 B1 | 5/2003 | Ericson et al. | |
| 6,570,997 B2 | 5/2003 | Noguchi | |
| 6,573,887 B1 | 6/2003 | O'Donnell, Jr. | |
| 6,577,299 B1 | 6/2003 | Schiller et al. | |
| 6,580,424 B1 | 6/2003 | Krumm | |
| 6,584,052 B1 | 6/2003 | Phillips et al. | |
| 6,585,154 B1 | 7/2003 | Ostrover et al. | |
| 6,592,039 B1 | 7/2003 | Smith et al. | |
| 6,603,464 B1 | 8/2003 | Rabin | |
| 6,625,313 B1 | 9/2003 | Morita et al. | |
| 6,628,267 B2 | 9/2003 | Karidis et al. | |
| 6,650,320 B1 | 11/2003 | Zimmerman | |
| 6,651,894 B2 | 11/2003 | Nimura et al. | |
| 6,655,597 B1 | 12/2003 | Swartz et al. | |
| 6,661,920 B1 | 12/2003 | Skinner | |
| 6,663,008 B1 | 12/2003 | Pettersson et al. | |
| 6,671,386 B1 | 12/2003 | Shimizu et al. | |
| 6,674,427 B1 | 1/2004 | Pettersson et al. | |
| 6,681,045 B1 | 1/2004 | Lapstun et al. | |
| 6,686,910 B2 | 2/2004 | O'Donnell, Jr. | |
| 6,689,966 B2 | 2/2004 | Wiebe | |
| 6,693,615 B2 | 2/2004 | Hill et al. | |
| 6,697,056 B1 | 2/2004 | Bergelson et al. | |
| 6,728,000 B1 | 4/2004 | Lapstun et al. | |
| 6,729,543 B1 | 5/2004 | Arons et al. | |
| 6,731,271 B1 | 5/2004 | Tanaka et al. | |
| 6,732,927 B2 | 5/2004 | Olsson et al. | |
| 6,738,053 B1 | 5/2004 | Borgstrom et al. | |
| 6,744,967 B2 | 6/2004 | Kaminski et al. | |
| 6,752,317 B2 | 6/2004 | Dymetman et al. | |
| 6,760,009 B2 | 7/2004 | Omura et al. | |
| 6,783,069 B1 | 8/2004 | Hecht et al. | |
| 6,819,776 B2 | 11/2004 | Chang | |
| 6,831,273 B2 | 12/2004 | Jenkins et al. | |
| 6,832,724 B2 | 12/2004 | Yavid et al. | |
| 6,834,081 B2 | 12/2004 | Kim et al. | |
| 6,834,195 B2 | 12/2004 | Brandenberg et al. | |
| 6,834,337 B1 | 12/2004 | Mitchell et al. | |
| 6,847,356 B1 | 1/2005 | Hasegawa et al. | |
| 6,856,712 B2 | 2/2005 | Fauver et al. | |
| 6,862,371 B2 | 3/2005 | Mukherjee | |
| 6,864,880 B2 | 3/2005 | Hugosson et al. | |
| 6,865,325 B2 | 3/2005 | Ide et al. | |
| 6,870,966 B1 | 3/2005 | Silverbrook et al. | |
| 6,874,420 B2 * | 4/2005 | Lewis et al. | 101/485 |
| 6,879,731 B2 | 4/2005 | Kang et al. | |

| | | |
|---|---|---|
| 6,880,124 B1 | 4/2005 | Moore |
| 6,880,755 B2 | 4/2005 | Gorbet et al. |
| 6,897,854 B2 | 5/2005 | Cho et al. |
| 6,898,297 B2 | 5/2005 | Katsura et al. |
| 6,919,892 B1 | 7/2005 | Cheiky et al. |
| 6,929,183 B2 | 8/2005 | Pettersson |
| 6,933,933 B2 | 8/2005 | Fleming |
| 6,935,562 B2 | 8/2005 | Hecht et al. |
| 6,938,222 B2 | 8/2005 | Hullender et al. |
| 6,956,968 B1 | 10/2005 | O'Dell et al. |
| 6,960,777 B2 | 11/2005 | Soar |
| 6,964,483 B2 | 11/2005 | Wang et al. |
| 6,968,083 B2 | 11/2005 | Williams et al. |
| 6,970,183 B1 | 11/2005 | Monroe |
| 6,975,334 B1 | 12/2005 | Barrus |
| 6,976,220 B1 | 12/2005 | Lapstun et al. |
| 6,987,534 B1 * | 1/2006 | Seta .................... 348/229.1 |
| 6,992,655 B2 | 1/2006 | Ericson et al. |
| 6,993,185 B2 * | 1/2006 | Guo et al. .................... 382/176 |
| 6,999,622 B2 | 2/2006 | Komatsu |
| 7,003,150 B2 | 2/2006 | Trajkovi |
| 7,009,594 B2 | 3/2006 | Wang et al. |
| 7,012,621 B2 | 3/2006 | Crosby et al. |
| 7,024,429 B2 | 4/2006 | Ngo et al. |
| 7,036,938 B2 | 5/2006 | Wang et al. |
| 7,048,198 B2 | 5/2006 | Ladas et al. |
| 7,092,122 B2 | 8/2006 | Iwaki et al. |
| 7,110,604 B2 | 9/2006 | Olsson et al. |
| 7,111,230 B2 | 9/2006 | Euchner et al. |
| 7,116,840 B2 | 10/2006 | Wang et al. |
| 7,119,816 B2 | 10/2006 | Zhang et al. |
| 7,123,742 B2 | 10/2006 | Chang |
| 7,133,031 B2 | 11/2006 | Wang et al. |
| 7,133,563 B2 | 11/2006 | Wang et al. |
| 7,136,054 B2 | 11/2006 | Wang et al. |
| 7,139,740 B2 | 11/2006 | Ayala |
| 7,142,197 B2 | 11/2006 | Wang et al. |
| 7,142,257 B2 | 11/2006 | Callison et al. |
| 7,145,556 B2 | 12/2006 | Pettersson |
| 7,167,164 B2 | 1/2007 | Ericson et al. |
| 7,176,906 B2 | 2/2007 | Williams et al. |
| 7,190,843 B2 | 3/2007 | Wei et al. |
| 7,222,799 B2 | 5/2007 | Silverbrook |
| 7,225,979 B2 | 6/2007 | Silverbrook et al. |
| 7,262,764 B2 | 8/2007 | Wang et al. |
| 7,263,224 B2 | 8/2007 | Wang et al. |
| 7,289,103 B2 | 10/2007 | Lapstun et al. |
| 7,292,370 B2 | 11/2007 | Iwaki et al. |
| 7,293,240 B2 | 11/2007 | Lapstun et al. |
| 7,295,193 B2 | 11/2007 | Fahraeus |
| 7,330,605 B2 | 2/2008 | Wang et al. |
| 7,359,094 B1 | 4/2008 | Sayuda |
| 7,386,191 B2 | 6/2008 | Wang et al. |
| 7,400,777 B2 | 7/2008 | Wang et al. |
| 7,403,658 B2 | 7/2008 | Lin et al. |
| 7,421,439 B2 | 9/2008 | Wang et al. |
| 7,430,497 B2 | 9/2008 | Wang et al. |
| 7,440,134 B2 | 10/2008 | Natori |
| 7,440,583 B2 | 10/2008 | Tohne et al. |
| 7,463,784 B2 | 12/2008 | Kugo |
| 7,486,822 B2 | 2/2009 | Wang et al. |
| 7,486,823 B2 | 2/2009 | Wang et al. |
| 7,502,508 B2 | 3/2009 | Wang et al. |
| 7,505,982 B2 | 3/2009 | Wang et al. |
| 7,528,848 B2 | 5/2009 | Xu et al. |
| 7,532,366 B1 | 5/2009 | Yang et al. |
| 7,536,051 B2 | 5/2009 | Lin et al. |
| 7,542,976 B2 | 6/2009 | Wang et al. |
| 7,570,813 B2 | 8/2009 | Wang et al. |
| 7,580,576 B2 | 8/2009 | Wang et al. |
| 7,583,842 B2 | 9/2009 | Lin et al. |
| 2001/0024193 A1 | 9/2001 | Fahraeus |
| 2001/0038383 A1 | 11/2001 | Ericson et al. |
| 2001/0053238 A1 | 12/2001 | Katsura et al. |
| 2002/0028018 A1 | 3/2002 | Hawkins et al. |
| 2002/0031622 A1 | 3/2002 | Ippel et al. |
| 2002/0048404 A1 | 4/2002 | Fahraeus et al. |
| 2002/0050982 A1 | 5/2002 | Ericson |
| 2002/0069220 A1 | 6/2002 | Tran |
| 2002/0163511 A1 | 11/2002 | Sekendur |
| 2002/0179717 A1 | 12/2002 | Cummings et al. |
| 2003/0001020 A1 | 1/2003 | Kardach |
| 2003/0009725 A1 | 1/2003 | Reichenbach |
| 2003/0030638 A1 | 2/2003 | Astrom et al. |
| 2003/0034961 A1 | 2/2003 | Kao |
| 2003/0050803 A1 | 3/2003 | Marchosky |
| 2003/0081000 A1 | 5/2003 | Watanabe et al. |
| 2003/0088781 A1 | 5/2003 | ShamRao |
| 2003/0090475 A1 | 5/2003 | Paul et al. |
| 2003/0117378 A1 | 6/2003 | Carro |
| 2003/0118233 A1 | 6/2003 | Olsson |
| 2003/0128194 A1 | 7/2003 | Pettersson |
| 2003/0146883 A1 | 8/2003 | Zelitt |
| 2003/0159044 A1 | 8/2003 | Doyle et al. |
| 2003/0179906 A1 | 9/2003 | Baker et al. |
| 2003/0214553 A1 | 11/2003 | Dodge |
| 2003/0214669 A1 | 11/2003 | Saitoh |
| 2004/0032393 A1 | 2/2004 | Brandenberg et al. |
| 2004/0085286 A1 | 5/2004 | Wang et al. |
| 2004/0085302 A1 | 5/2004 | Wang et al. |
| 2004/0086181 A1 | 5/2004 | Wang et al. |
| 2004/0090429 A1 | 5/2004 | Geaghan et al. |
| 2004/0128264 A1 | 7/2004 | Leung et al. |
| 2004/0128511 A1 | 7/2004 | Sun et al. |
| 2004/0153649 A1 | 8/2004 | Rhoads et al. |
| 2004/0233163 A1 | 11/2004 | Lapstun et al. |
| 2005/0044164 A1 | 2/2005 | O'Farrell et al. |
| 2005/0052700 A1 | 3/2005 | Mackenzie et al. |
| 2005/0104909 A1 | 5/2005 | Okamura et al. |
| 2005/0106365 A1 | 5/2005 | Palmer et al. |
| 2005/0138541 A1 | 6/2005 | Euchner et al. |
| 2005/0146518 A1 | 7/2005 | Wang et al. |
| 2005/0147281 A1 | 7/2005 | Wang et al. |
| 2005/0193292 A1 | 9/2005 | Lin et al. |
| 2006/0082557 A1 | 4/2006 | Ericson et al. |
| 2006/0109263 A1 | 5/2006 | Wang et al. |
| 2006/0123049 A1 | 6/2006 | Wang et al. |
| 2006/0125805 A1 | 6/2006 | Marggraff |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0267965 A1 | 11/2006 | Clary |
| 2006/0274948 A1 | 12/2006 | Wang et al. |
| 2007/0001950 A1 | 1/2007 | Zhang et al. |
| 2007/0003150 A1 | 1/2007 | Xu et al. |
| 2007/0041654 A1 | 2/2007 | Wang et al. |
| 2007/0042165 A1 | 2/2007 | Wang et al. |
| 2008/0025612 A1 | 1/2008 | Wang et al. |
| 2009/0110308 A1 | 4/2009 | Wang et al. |
| 2009/0119573 A1 | 5/2009 | Wang et al. |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |
| JP | 04253087 | 9/1992 |
| JP | 06006316 | 1/1994 |
| JP | 06209482 | 7/1994 |
| JP | 06230886 | 8/1994 |

| | | |
|---|---|---|
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-03038741 | 5/2003 |
| WO | WO-2005106638 | 10/2005 |

OTHER PUBLICATIONS

U.S. Appl. No. 11/066,800, Wang.
U.S. Appl. No. 11/067,193, Yang.
U.S. Appl. No. 11/089,189, Wang.
U.S. Appl. No. 11/142,844, Wang.
U.S. Appl. No. 12/131,810, Wang.
U.S. Appl. No. 12/180,484, Wang.
Otsu, Nobuyuki, "A Threshold Selection Method from Gray-Level Histograms," IEEE Transactions on Systems, IEEE Systems, Man and Cybernetics Society, Jan. 1979, vol. SMC-9, No. 1, pp. 62-66.
IEEExplore # Search Session History, May 7, 2008, http://ieee.org/search/history.jsp, 1 page.
U.S. Appl. No. 12/138,339, filed Jun. 12, 2008, Wang et al.
"VPEN, Revolutionizing Human Interaction With The Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "ThingssThat See," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler Number of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. EP 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanners," Nec. vol. 51, No. 10, 1998.
Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
Hecht, D.L., "Printed embedded data graphical user interfaces," Computer vol. 34, Issue 3, Mar. 2001, pp. 47-55.
International Search Report for Application No. PCT/US2006/032230; Applicant: Microsoft Corporation; Date of Mailing: Jan. 9, 2007 (3 pages).
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00/asp, dated Sep. 5, 2003.
Internet Print Out: "Maxell Digital Pen To Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "N-Scribe for Digital Writing," Flash Commerce News, http://flashcommerce.com/articles/, dated Sep. 5, 2003.
Internet Print Out: "N-Scribe For Digital Writing," Mobileinfo.com, News issue #2001-15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.
Internet Print Out: "Preprocessing in the Npen++ System," http://www.is.cs.cmu.edu/mie/multimodal_npen_preproc.html, dated Aug. 8, 2002.
Internet Print Out: "RF Pen Sends Your Scribbles," Appliance Manufacturing Magazine, http://www.ammagazine.com. Dated Sep. 26, 2002.

Internet Print Out: "SMART Board Interactive Whiteboard," Smarttech, http://www.smarttech.com, pp. 1-26, Sep. 5, 2003.
Internet Print Out: "The Hot New Medium: Paper—How the Oldest Interface in The Book is Redrawing The Map Of The Networked World," http://www.wired.com/wired/, dated Sep. 5, 2003.
Internet Print Out: "Anoto functionality," News, dated Jul. 15, 2002.
Internet Print Out: "Anoto functionality," Showroom, dated Jul. 15, 2002.
Internet Print Out: "ChatPen CHA-30 " Digital Pens, Anoto Functionality, dated Jul. 15, 2002.
Internet Print Out: "Cintiq18SX—A Powerful New Way To Work Directly On The Screen," Wacom Technology, Cintiq-Interactive Pen Display, dated Sep. 5, 2003.
Internet Print Out: "Communicate Digitally With Ordinary Pen and Paper," Anoto Functionality, dated Jul. 15, 2002.
Internet Print Out: "Creating A Global De Facto Standard," Anoto Functionality, dated Jul. 15, 2002.
Internet Print Out: "Daily News," dated Aug. 15, 2002.
Internet Print Out: "Digital Pens and Technical Data," Anoto Functionality, dated Jul. 15, 2002.
Internet Print Out: "Downloads," Anoto Functionality, dated Jul. 15, 2002.
Internet Print Out: "Optical Translation Measurement (OTM™)," Technologies, dated Jul. 15, 2002.
Internet Print Out: "Partners Supporting Anoto Functionality," Anoto Functionality, dated 15, 2002.
Internet Print Out: "Possibilities," Anoto Functionality, dated Jul. 15, 2002.
Internet Print Out: "Product VPen™," OTM Technologies, dated Jul. 15, 2002.
Internet Print Out: "Products—Get Everyone On The Same Page," Mimio, dated Sep. 5, 2003.
Internet Print Out: "Sensor Board and Pen," Wacom, Product, dated Jul. 15, 2002.
Internet Print Out: "The Solution," Anoto Functionality, dated Jul. 15, 2002.
Internet Print Out: "Vision and Mission," Anoto Functionality, dated Jul. 15, 2002.
Internet Print Out: "Wacom Displays Pressure-Sensitive Pen Sensor for Tablet PCs," Wacom, News, dated Jul. 15, 2002.
Internet Print Out: "Welcome To www.anoto.com," Anoto, dated Jul. 15, 2002.
Internet Printout—http://www.anoto.com: Construction, Sep. 5, 2003.
Internet Printout—http://www.anoto.com: Page template, Sep. 5, 2003.
Internet Printout—http://www.anoto.com: Paper and Printing, Sep. 5, 2003.
Internet Printout—http://www.anoto.com: Paper space, Sep. 5, 2003.
Internet Printout—http://www.anoto.com: Pattern, Sep. 5, 2003.
Internet Printout—http://www.anoto.com: Printers supporting Anoto functionality, Sep. 5, 2003.
Internet Printout—http://www.anotofunctionality.com: Anoto Functionality—Anoto pattern & digital paper, Sep. 26, 2002.
Internet Printout—http://www.anotofunctionality.com: Anoto Functionality—Anoto pattern & digital paper, Sep. 5, 2003.
Internet Printout—http://www.anotofunctionality.com: Anoto Functionality—Applications, Sep. 5, 2003.
Internet Printout—http://www.anotofunctionality.com: Anoto Functionality—Corporate applications, Sep. 5, 2003.
Internet Printout—http://www.anotofunctionality.com: Anoto Functionality—Digital notes, Sep. 5, 2003.
Internet Printout—http://www.anotofunctionality.com: Anoto Functionality—Digital paper, Sep. 26, 2002.
Internet Printout—http://www.anotofunctionality.com: Anoto Functionality—Digital paper, Sep. 5, 2003.
Internet Printout—http://www.anotofunctionality.com: Anoto Functionality—Digital pens Use with mobile phones, Sep. 5, 2003.
Internet Printout—http://www.anotofunctionality.com: Anoto Functionality—Digital Pens Use with personal computers, Sep. 26, 2002.
Internet Printout—http://www.anotofunctionality.com: Anoto Functionality—Digital Pens, Sep. 26, 2002.
Internet Printout—http://www.anotofunctionality.com: Anoto Functionality—Digital pens, Sep. 5, 2003.
Internet Printout—http://www.anotofunctionality.com: Anoto Functionality—Digital service, Sep. 26, 2002.
Internet Printout—http://www.anotofunctionality.com: Anoto Functionality—Digital service, Sep. 5, 2003.
Internet Printout—http://www.anotofunctionality.com: Anoto Functionality—E-mail, Sep. 5, 2003.
Internet Printout—http://www.anotofunctionality.com: Anoto Functionality—Fax, Sep. 5, 2003.
Internet Printout—http://www.anotofunctionality.com: Anoto Functionality—Freedom of expression, Sep. 26, 2002.
Internet Printout—http://www.anotofunctionality.com: Anoto Functionality—Graphical SMS, Sep. 5, 2003.
Internet Printout—http://www.anotofunctionality.com: Anoto Functionality—Hints & tips Using your digital paper, Sep. 5, 2003.
Internet Printout—http://www.anotofunctionality.com: Anoto Functionality—Hints & tips Using your digital pen, Sep. 5, 2003.
Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.
Internet Printout—http://www.anotofunctionality.com: Anoto Functionality—Software and additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe for Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the SMART Board™ interactive whiteboard as fastest, most accurate way to interact with projected information, Sep. 5, 2003.
Internet Printout—http://www.smarttech.com: SMART Board Interactive Whiteboard—Front Projection Features, Sep. 5, 2003.
Internet Printout—http://www.smarttech.com: SMART Board Interactive Whiteboard—Q&A, Sep. 5, 2003.
Internet Printout—http://www.smarttech.com: SMART Board Interactive Whiteboard, Sep. 5, 2003.
Internet Printout—http://www.smarttech.com: SMART Camfire™, whiteboard camera system effortlessly saves dry-erase whiteboard notes, Sep. 5, 2003.
Internet Printout—http://www.smarttech.com: SMART Technologies Inc. awarded another U.S. patent for touch sensitive SMART Board™ technology, Sep. 5, 2003.
Internet Printout—http://www.smarttech.com: SMART Technologies, Inc. Press Releases, Sep. 5, 2003.

Internet Printout—http://www.smarttech.com: SMART Technologies, Inc., New annotation and software functionality on all SMART Board™ Interactive Whiteboards, Sep. 5, 2003.

Internet Printout—http://www.smarttech.com: What's New, Sep. 5, 2003.

Internet Printout—http://www.smarttech.com: Press Releases—SMART launches Research Assistance Program, Sep. 5, 2003.

Internet Printout—http://www.smarttech.com: SMART Board Interactive Whiteboard Profiles—Sep. 5, 2003.

Internet Printout—http://www.smarttech.com: SMART Board Software Features—Sep. 5, 2003.

Internet Printout—http://www.tabletpccorner.com: Anoto Pen Bluetooth, Sep. 5, 2003.

Internet Printout—http://www.techtv.com: Nscribe Pen and Presenter-to-Go, Sep. 5, 2003.

Internet Printout—http://www.wacom.com: Cintiq—Interactive Pen Display, Sep. 5, 2003.

Internet Printout—http://www.wacom.com: Graphire2—Have more fun with digital phones, Sep. 5, 2003.

Internet Printout—http://www.wacom.com: Intuos2—The Professional Tablet, Sep. 5, 2003.

Internet Printout—http://www.wacom.com: intuos2, Sep. 5, 2003.

Internet Printout—http://www.wacom.com: Penabled Wacom, Sep. 5, 2003.

Internet Printout—http://www.wacom.com: tablet PC, Sep. 5, 2003.

Internet Printout—http://www.wired.com: The Hot New Medium: Paper, Sep. 5, 2003.

Jelinek, Frederic, "Statistical Methods for Speech Recognition," The MIT Press, pp. 1-283, 2001.

Ko et al., "Finger Mouse and Gesture Recognition System As A New Human Computer Interface," Computer and Graphics, col. 21, No. 5, pp. 555-561, 1997.

Lau, R., "Adaptive Statistical Language Modeling," Submitted to the Dept. of Electrical Engineering and Computer Science in Partial Fulfillment for the Degree of Master of Science at the MIT, May 1994.

Lee, Kai-Fu, "Automatic Speech Recognition—The Development of the SPHINX System," Kluwer Academic Publishers, pp. 1-207, 1992.

Louderback, Jim, "Nscribe pen And Presenter-To-Go—Infrared Pen And New Springboard Module Make Their Debut At Demo 2001," Edgereview.com, http://www.techtv.com/freshgear.pr, dated Sep. 5, 2003.

Moran, et al., "Design and Technology for Collaborage: Collaborative Collages of Information on Physical Walls," Nov. 1999.

Munich, M.E.; Perona, P., "Visual Input for Pen-Based Computers," Image Processing, 1996, Proceedings International Conference on Sep. 16-19, 1996. vol. 1, pp. 173-176.

Nathan, K.S. et al., "On-Line Handwriting Recognition Using Continuous Parameter Hidden Markov Models," 1993 IEEE.

Okad, et al. "A Method for Document Digitizer by Real Time Assembling of Mosaic Pictures," Scripta Publishing Co., Systems, Computers, Controls, vol. 13, No. 5, Sep. 1982, pp. 74-80.

Okada et al., "A High-Resolution Handwriting Character Input Device Using Laser Beams," Department of Instrumentation Engineering, Faculty of Science and Technology, vol. 10.4, No. 11.1, 1981.

Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.

Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.

Sato et al., "Novel device for Inputting Handwriting Trajectory," Ricoh Technical Report No. 27, Nov. 2001, pp. 52-59, http://www.ricoh.co.jp/rdc/techreport/No27/Ronbun/A2707.pdf.

Sato et al., "Video Tablet—2D Coordinate Input Device With OCD Camera," Osaka University, vol. J67-D, No. 6, Jun. 1984.

Shum, Heung-Yeung, et al., "Panoramic Image Mosaics," Microsoft Research Technical Report MSR-TR-97-23, 1997, 53 pages.

Tang, Xiaoou et al., "Video-based handwritten Chinese character recognition," Circuits and Systems for Video Technology, IEEE Transactions, Jan. 2005, vol. 15, Issue 1, pp. 167-174.

Urbanski, Brian, "Don't Break This Ink Pen," Edgereview.com, http://www.edgereview.com/ataglance.cfm?category=edge&ID=180, dated Jul. 15, 2002.

Urbanski, Brian, "Don't Break This Ink Pen," Edgereview.com, http://www.edgereview.com/ataglance.cfm?category=edge&ID=180, dated Sep. 5, 2003.

Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

* cited by examiner

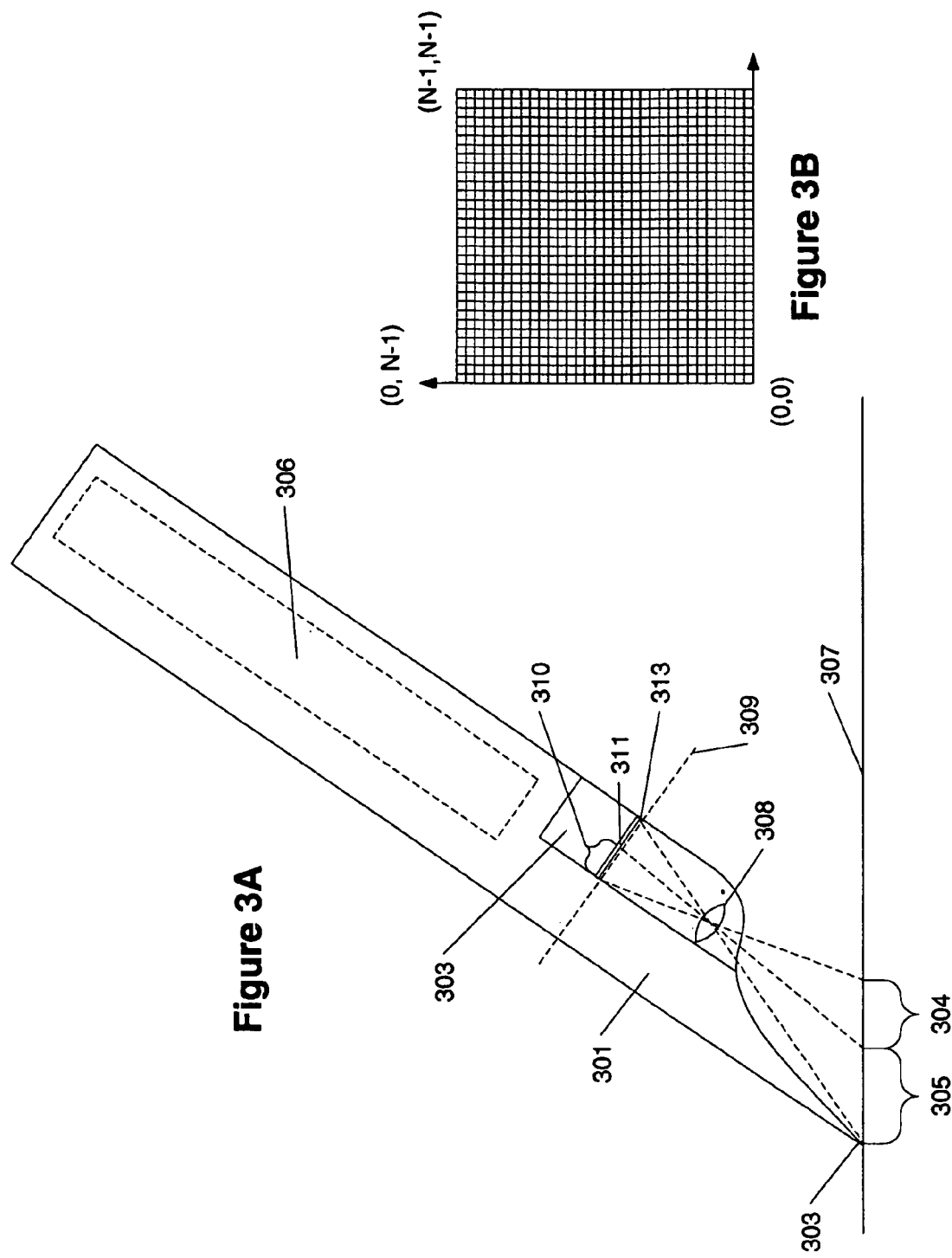

PREPROCESSING FOR INFORMATION PATTERN ANALYSIS

CROSS-REFERENCE TO RELATED APPLICATION(S)

This application is a divisional of U.S. patent application Ser. No. 11/138,959 entitled "PREPROCESSING FOR INFORMATION PATTERN ANALYSIS," filed May 25, 2005, now U.S. Pat. No. 7,400,777 issued Jul. 15, 2008, which application is hereby incorporated by reference in its entirety.

FIELD OF THE INVENTION

The present invention relates to processing an image for subsequent visual analysis. Various aspects of the present invention are particularly applicable to preprocessing an image so that marks forming in information pattern in the image can be easily distinguished from other objects in the image in a later processing operation.

BACKGROUND OF THE INVENTION

While electronic documents stored on computers provide a number of advantages over written documents, many users continue to perform some tasks with printed versions of electronic documents. These tasks include, for example, reading and annotating the documents. With annotations, the paper version of the document assumes particular significance, because the annotations typically are written directly onto the printed document. One of the problems, however, with directly annotating a printed version of a document is the difficulty in later converting the annotations into electronic form. Ideally, electronically stored annotations should correspond with the electronic version of the document in the same way that the handwritten annotations correspond with the printed version of the document.

Storing handwritten annotations in electronic form typically requires a user to review each handwritten annotation and personally enter it into a computer. In some cases, a user may scan the annotations written on a printed document, but this technique creates a new electronic document. The user must then reconcile the original version of the electronic document with the version having the scanned annotations. Further, scanned images frequently cannot be edited. Thus, there may be no way to separate the annotations from the underlying text of the original document. This makes using the annotations difficult.

To address this problem, pens have been developed to capture annotations written onto printed documents. In addition to a marking instrument, this type of pen includes a camera. The camera captures images of the printed document as a user writes annotations with the marking instrument. In order to associate the images with the original electronic document, however, the position of the images relative to the document must be determined. Accordingly, this type of pen often is employed with specialized media having an information pattern printed on the writing surface. The information pattern represents a code that is generated such that the different sections of the pattern occurring around a location on the media will uniquely identify that location. By analyzing or "decoding" this information pattern, a computer receiving an image from the camera can thus determine what portions of the code (and thus what portion of a document printed on the paper) were captured in the image. One example of this type of information pattern is described in U.S. patent application Ser. No. 10/284,412, entitled "Active Embedded Interaction Code," filed on Oct. 31, 2002, and naming Jian Wang et al. as inventors, which application is incorporated entirely herein by reference. In addition to providing location information, various implementations of this type of information pattern can alternately or additionally be used to represent other types of information as metadata, such as a document identification number.

While the use of such patterned paper or other media allows written annotations on a paper document to be converted into electronic form and properly associated with the electronic version of the document, this technique presents its own difficulties. For example, because the camera is mounted on the pen, both the pen and the writer's hand may affect the quality of the captured images. When writing with a pen, very few users will maintain the pen in a completely vertical direction. Instead, most users will tilt the pen toward their person, toward their person and to their left, or toward their person and to their right. A few users may even tilt the pen away from their person.

The various tilting angle between pen and paper will make the illumination of captured image varies correspondingly. For example, the gray level of an image captured from a blank area will be different from one area to another. Even if the pen includes a light, such as an infrared LED, mounted near the pen tip for illumination, when the pen is tilted the distance between the writing surface and the image sensor will not be uniform, resulting in a non-uniform illumination for the image.

In addition, the printed document itself may obscure areas of the pattern printed on the writing surface of the media. That is, the content making up the document, such as text and pictures, may obscure or occlude portions of the information pattern printed on the writing surface. If the pen captures an image of one of these areas, then the computer may not be able to use distinguish the information pattern from the content. Also, the computer may not accurately recognize the code from the image. For example, if the code is binary, then the computer may erroneously recognize a portion of the pattern representing a "0" value as a "1" value, or vice versa.

BRIEF SUMMARY OF THE INVENTION

Various aspects of the invention provide pre-processing techniques for processing an image to improve the distinctiveness of an information pattern captured in the image before the information pattern is analyzed in a decoding process. According to various implementations of the invention, the brightness of an image first is normalized. In particular, an image is divided into blocks of areas, such as pixels. A brightness distribution value then is determined for each area of the image by interpolating the brightness of its surrounding blocks. A normalized brightness value for each area can then be obtained by dividing the original brightness value for the area by the brightness distribution value.

Still other examples of the invention may alternately or additionally create masks for distinguishing an information pattern captured in the image from content captured in the image. For example, some implementations of the invention will create a mask corresponding to the content printed on the writing medium, so that this content can be excluded from analysis regarding the information pattern. Still other implementations of the invention will create a mask corresponding to the information pattern printed on the writing medium, so that the pattern can be distinctly identified. With various examples of the invention, these masks may be generated based upon contrast differences between the brightness of pixels representing the information pattern, the brightness of pixels representing content, and the brightness of pixels representing the background of the writing medium.

BRIEF DESCRIPTION OF THE DRAWINGS

FIG. 3A illustrates an example of a pen/camera device that can be employed according to various embodiments of the invention, while FIG. 3B illustrates the resolution of an image that may be obtained by various embodiments of the invention.

DETAILED DESCRIPTION OF THE INVENTION

Overview

Figure 1:
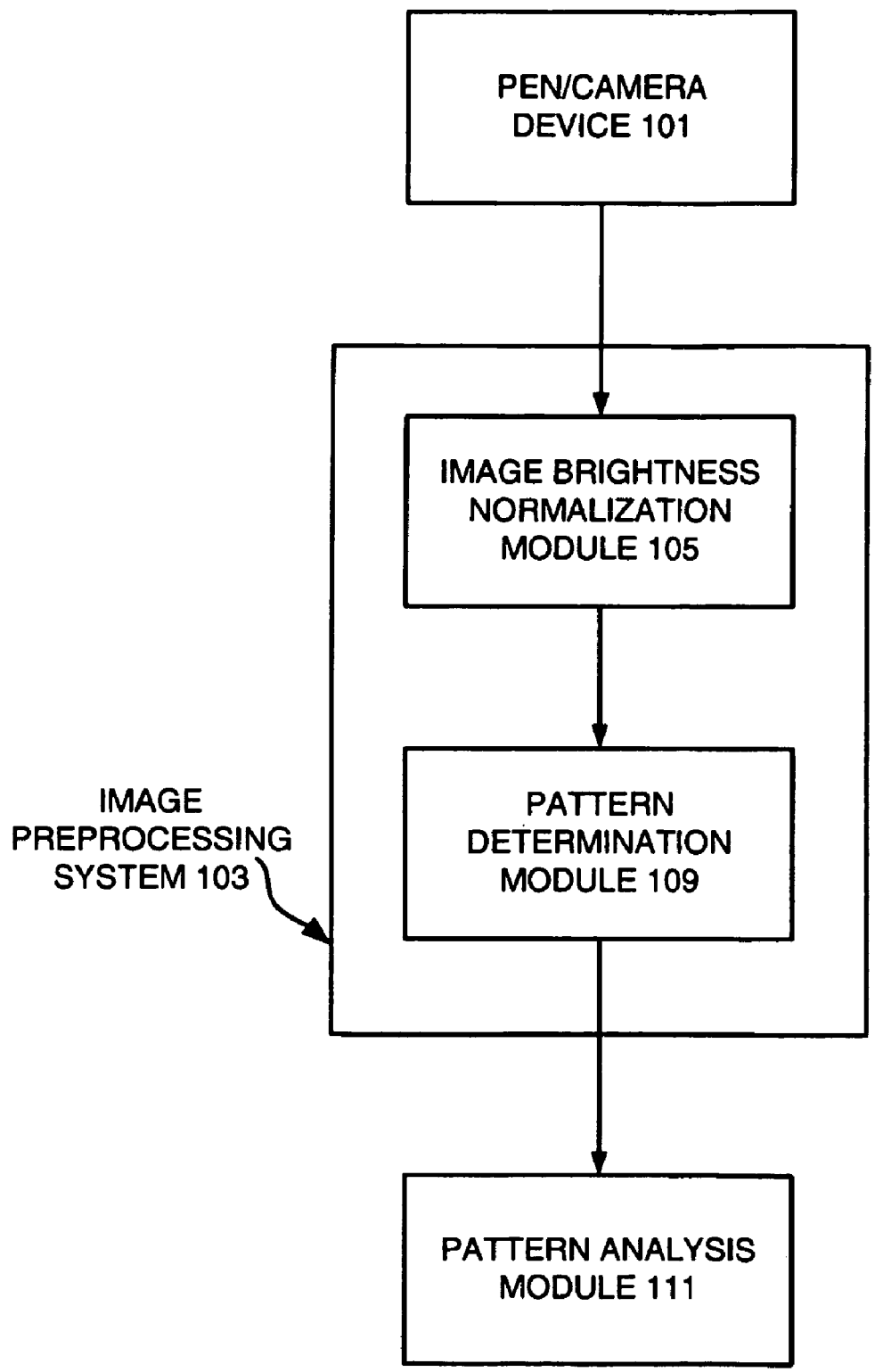
FIG. 1 shows a general description of a computer that may be used in conjunction with embodiments of the present invention.

FIG. 1 illustrates an example of a preprocessing system that may be implemented according to various examples of the invention. As seen in this figure, a pen/camera device 101 provides a captured image to the image preprocessing system 103. More particularly, the pen/camera device 101 provides a captured image to the image brightness normalization module 105. As will be explained in greater detail below, the image brightness normalization module 105 normalizes the brightness of the different areas in the image, in order to mitigate the affects of inconsistent illumination during the operation of the pen/camera device 101.

Once the brightness of the captured image has been normalized, the image brightness normalization module 105 provides the normalized image to the pattern determination module 109. As will also be described in more detail below, the pattern determination module 109 analyzes the normalized image to identify areas having differences in brightness above a threshold level, in order to distinguish those areas in the normalized image that represent content from those areas in the normalized image that represent the information pattern. In this manner, the information pattern can be more accurately distinguished from the remainder of the captured image. The preprocessed image is then provided to the pattern analysis module 111 for further processing to determine the portion of the information pattern captured in the image, and thus the location of the pen/camera device 101 when the image was obtained.

Operating Environment

Figure 2:
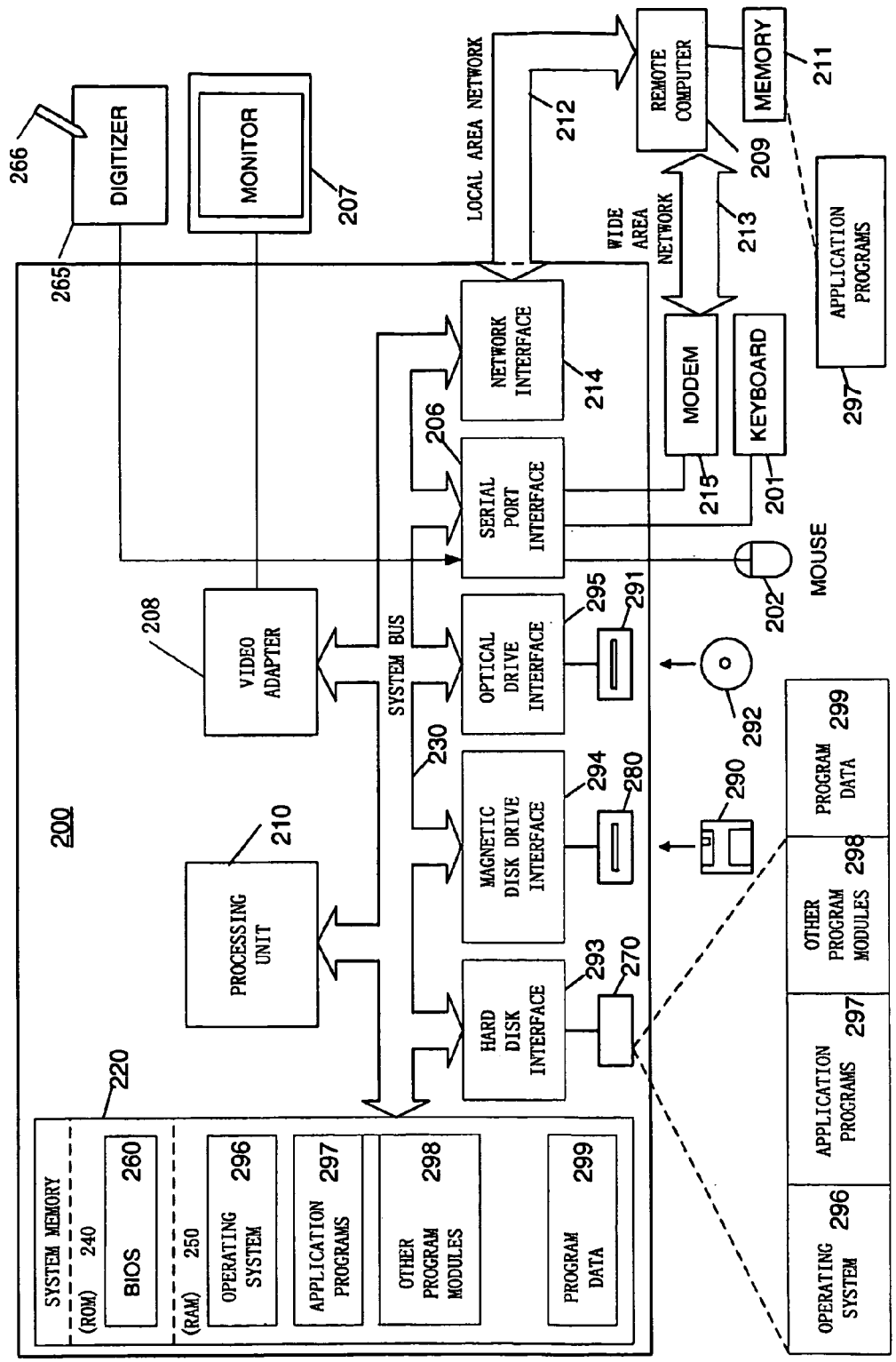
FIG. 2 illustrates an example of a computing system of the type that may be employed to implement various embodiments of the invention.

While some embodiments of the invention may be implemented using analog circuits, various embodiments of the invention will typically be implemented by executing software instructions on a programmable computer system. Accordingly, FIG. 2 shows a functional block diagram of an example of a conventional general-purpose digital computing environment that can be used to implement various aspects of the present invention. In FIG. 2, a computer 200 includes a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory 220 includes read only memory (ROM) 240 and random access memory (RAM) 250.

A basic input/output system 260 (BIOS), containing the basic routines that help to transfer information between elements within the computer 200, such as during start-up, is stored in the ROM 240. The computer 200 also includes a hard disk drive 270 for reading from and writing to a hard disk (not shown), a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 293, a magnetic disk drive interface 294, and an optical disk drive interface 295, respectively. The drives and their associated computer-readable media provide nonvolatile storage of computer readable instructions, data structures, program modules and other data for the personal computer 200. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 290, optical disk 292, ROM 240 or RAM 250, including an operating system 296, one or more application programs 297, other program modules 298, and program data 299. A user can enter commands and information into the computer 200 through input devices such as a keyboard 201 and pointing device 202. Other input devices (not shown) may include a microphone, joystick, game pad, satellite dish, scanner or the like. These and other input devices are often connected to the processing unit 210 through a serial port interface 206 that is coupled to the system bus, but may be connected by other interfaces, such as a parallel port, game port or a universal serial bus (USB). Further still, these devices may be coupled directly to the system bus 230 via an appropriate interface (not shown). A monitor 207 or other type of display device is also connected to the system bus 230 via an interface, such as a video adapter 208. In addition to the monitor, personal computers typically include other peripheral output devices (not shown), such as speakers and printers. In a preferred embodiment, a pen digitizer 265 and accompanying pen or stylus 266 are provided in order to digitally capture freehand input. Although a direct connection between the pen digitizer 265 and the serial port is shown, in practice, the pen digitizer 265 may be coupled to the processing unit 210 directly, via a parallel port or other interface and the system bus 230 as known in the art. Furthermore, although the digitizer 265 is shown apart from the monitor 207, it is preferred that the usable input area of the digitizer 265 be co-extensive with the display area of the monitor 207. Further still, the digitizer 265 may be integrated in the monitor 207, or may exist as a separate device overlaying or otherwise appended to the monitor 207.

The computer 200 can operate in a networked environment using logical connections to one or more remote computers, such as a remote computer 209. The remote computer 209 can be a server, a router, a network PC, a peer device or other common network node, and typically includes many or all of the elements described above relative to the computer 200, although only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets and the Internet.

When used in a LAN networking environment, the computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Device

As previously noted, various embodiments of the invention may be employed to determine the locations of portions of a document captured by a series of images. The determination of the location of a portion of a document captured in an image may be used to ascertain the location of a user's interaction with paper, a display screen, or other medium displaying the document. According to some implementations of the invention, the images may be obtained by an ink pen used to write ink on paper. With other embodiments of the invention, the pen may be a stylus used to "write" electronic ink on the surface of a digitizer displaying the document.

FIGS. 3A and 3B show an illustrative example of a pen 301 that may be employed as the pen/camera device 101 according to various embodiments of the invention. The pen 301 includes a tip 302 and a camera 303. The tip 302 that may or may not include an ink reservoir. The camera 303 captures an image 304 from surface 307. The pen 301 may further include additional sensors and/or processors as represented in broken box 306. These sensors and/or processors 306 may also include the ability to transmit information to another pen 301 and/or a personal computer (for example, via Bluetooth or other wireless protocols).

FIG. 3B represents an image as viewed by the camera 303. In one illustrative example, the resolution of an image captured by the camera 303 is N×N pixels (where, in the illustrated example, N=32). Accordingly, FIG. 3B shows an example image 32 pixels long by 32 pixels wide. The size of N is adjustable, and a higher value of N will provide a higher image resolution. Also, while the image captured by the camera 303 is shown as a square for illustrative purposes here, the field of view of the camera may include other shapes as is known in the art. The images captured by camera 303 may be defined as a sequence of image frames $\{I_i\}$, where $I_i$ is captured by the pen 301 at sampling time $t_i$. The sampling rate may be large or small, depending on system configuration and performance requirement. The size of the captured image frame may be large or small, depending on system configuration and performance requirement.

FIG. 3A also shows the image plane 309 on which an image 310 of the pattern from location 304 is formed. Light received from the pattern on the object plane 307 is focused by lens 308. According to various embodiments of the invention, the lens 308 may be a single lens or a multi-part lens system, but is represented here as a single lens for simplicity. Image capturing sensor 311 captures the image 310.

The image sensor 311 may be large enough to capture the image 310. Alternatively, the image sensor 311 may be large enough to capture an image of the pen tip 303 at location 313. For reference, the image at location 313 will be referred to as the virtual pen tip. It should be noted that the virtual pen tip location with respect to image sensor 311 is fixed because of the constant relationship between the pen tip, the lens 308, and the image sensor 311.

Figure 3C:
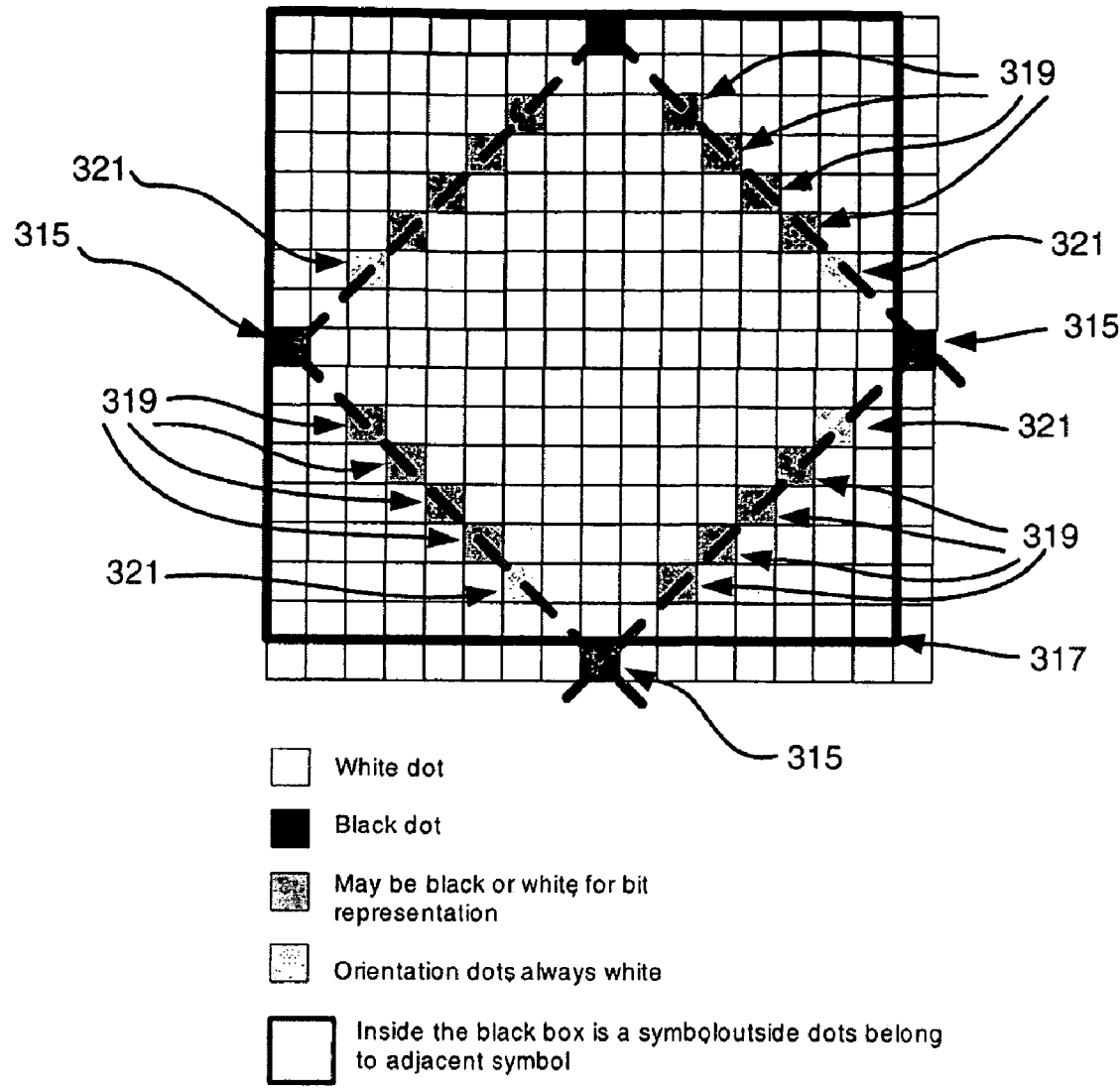
FIG. 3C then illustrates an example of a code symbol that can be employed to create an information pattern according to various examples of the invention.

FIG. 3C illustrates an example of a code symbol that can be used to represent one or more bits making up an information pattern. As seen in this figure, the code symbol has four black dark dots 315 that represent the border of the symbol 317. It also includes data dots 319 that can be either marked black or left white (or blank) to represent data bits. Still further, the illustrated code symbol includes orientation dots 321 that are always left white (or blank) to allow the decoding process to determine an orientation of the symbol.

As discussed herein, a code symbol is the smallest unit of visual representation of an information pattern. Generally, a code symbol will include the pattern data represented by the symbol. As shown in the illustrated example, one or more bits may be encoded in one code symbol. Thus, for a code symbol with 1 bit represented, the represented data may be "0" or "1", for a code symbol representing 2 bits, the represented data may be "00", "01", "10" or "11." Thus, a code symbol can represent any desired amount of data for the information pattern. The code symbol also will have a physical size. When the information pattern is, for example, printed on paper, the size of a code symbol can be measured by printed dots. For example, the illustrated code symbol is 16×16 printed dots. With a 600 dpi printer, the diameter of a printed dot will be about 0.04233 mm.

Still further, a code symbol will have a visual representation. For example, if a code symbol represents 2 bits, the visual representation refers to the number and position distribution of the black dots used to represent the data values "00", "01", "10" or "11". Thus, the code symbol illustrated in FIG. 3C may be referred to as a "8-a-16" symbol, since it represents 8 data bits using a 16×16 array of discrete areas. Of course, symbols having a variety of different represented pattern data values, sizes, and visual representation configurations will be apparent to those of ordinary skill in the art upon consideration of this description.

Brightness Normalization

Figure 4:
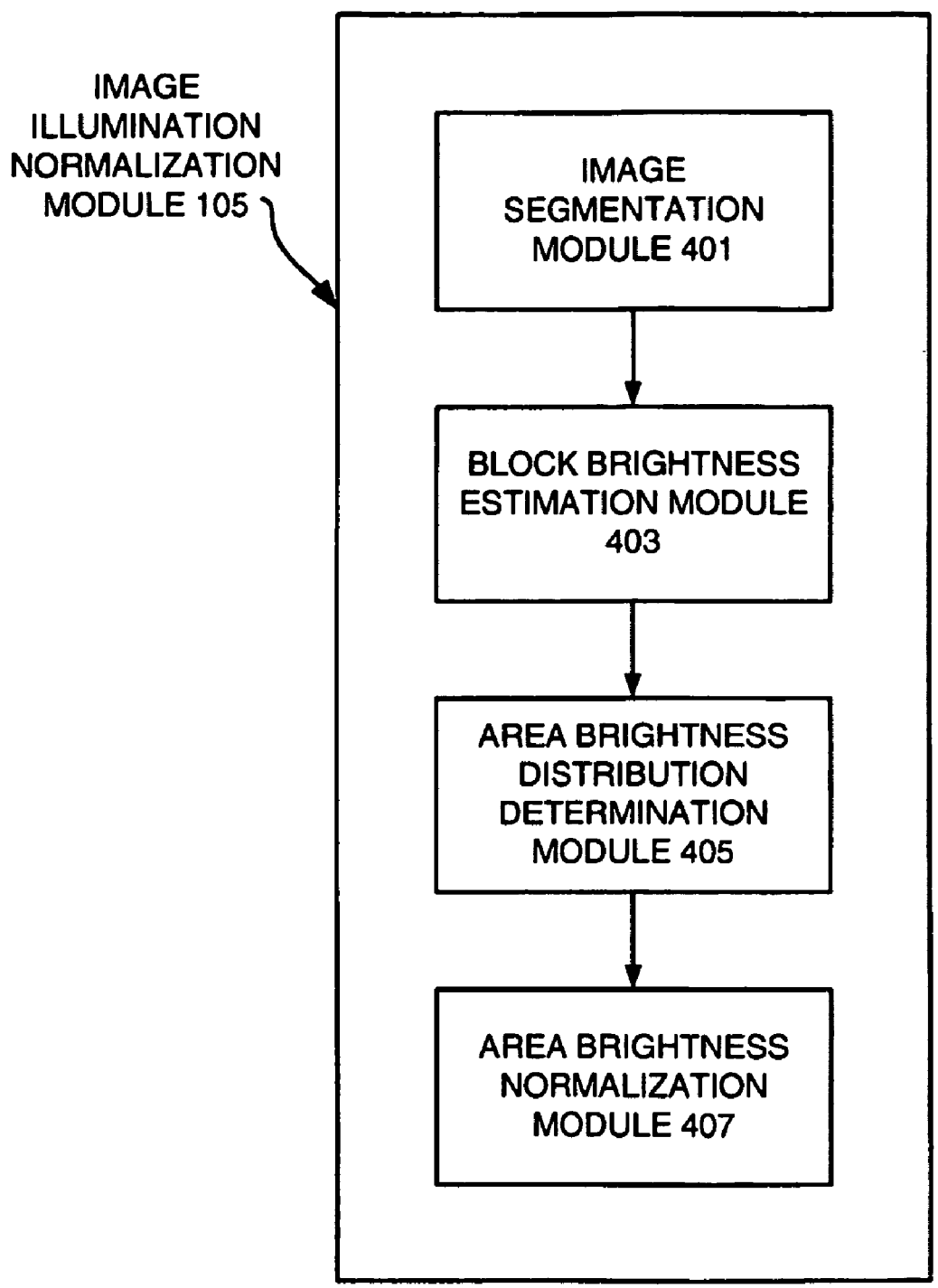
FIG. 4 illustrates an example of an image brightness normalization module that may be employed to normalize the brightness of an image according to various embodiments of the invention.

FIG. 4 illustrates one example of an image brightness normalization tool that may be employed for the image brightness normalization module 105 shown in FIG. 1. The image brightness normalization module 105 includes an image segmentation module 401 that segments an image into blocks of smaller areas, such as pixels, and a block brightness estimation module 403 that estimates the brightness of each block. The image brightness normalization module 105 also has an area brightness distribution determination module 405. This module performs a bilinear fitting of the brightness distribution for each area, as will be explained in more detail below. Still further, the image brightness normalization module 105 includes an area brightness normalization module 407, which normalizes the brightness of each area in the image. The operation of each of these modules will be discussed in greater detail with reference FIGS. 5A-14.

Figure 5A:
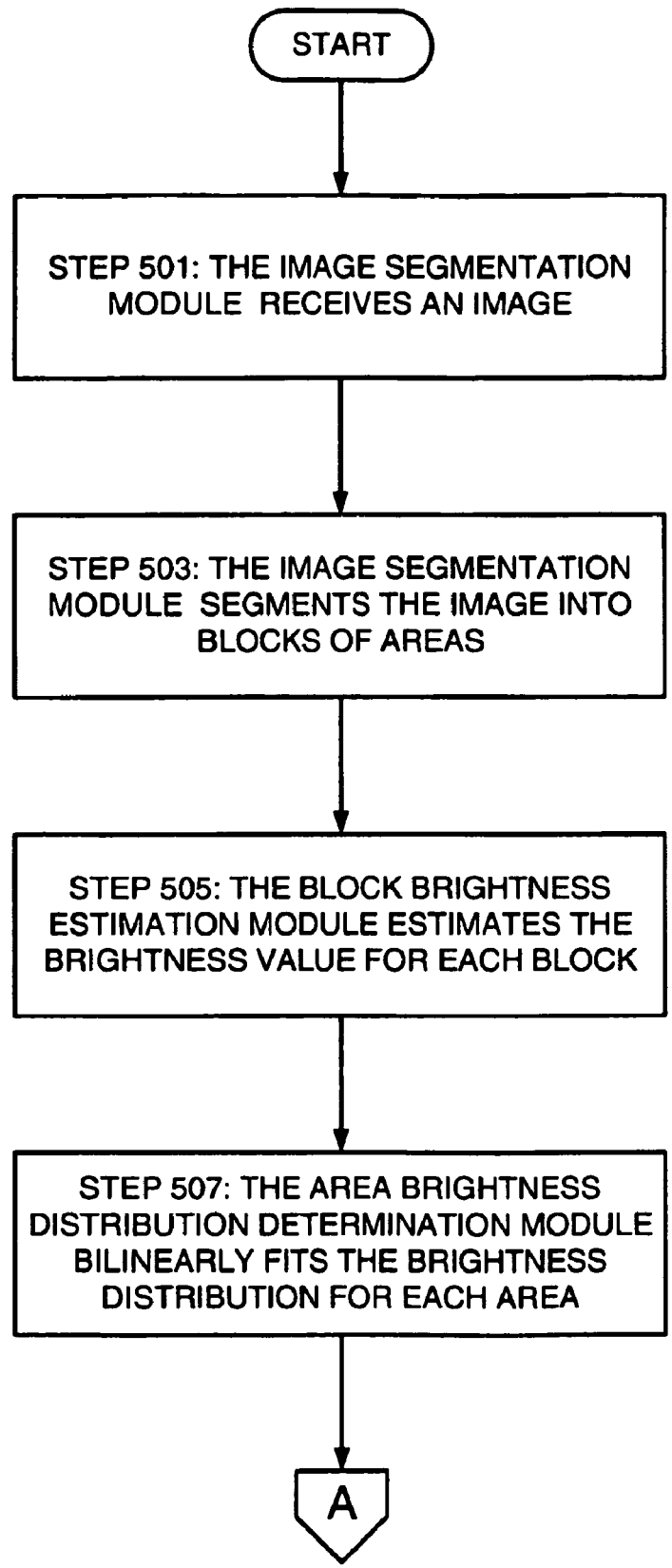
FIGS. 5A and 5B illustrate a flowchart describing the operation of the image brightness normalization module illustrated in FIG. 4.
Figure 5B:
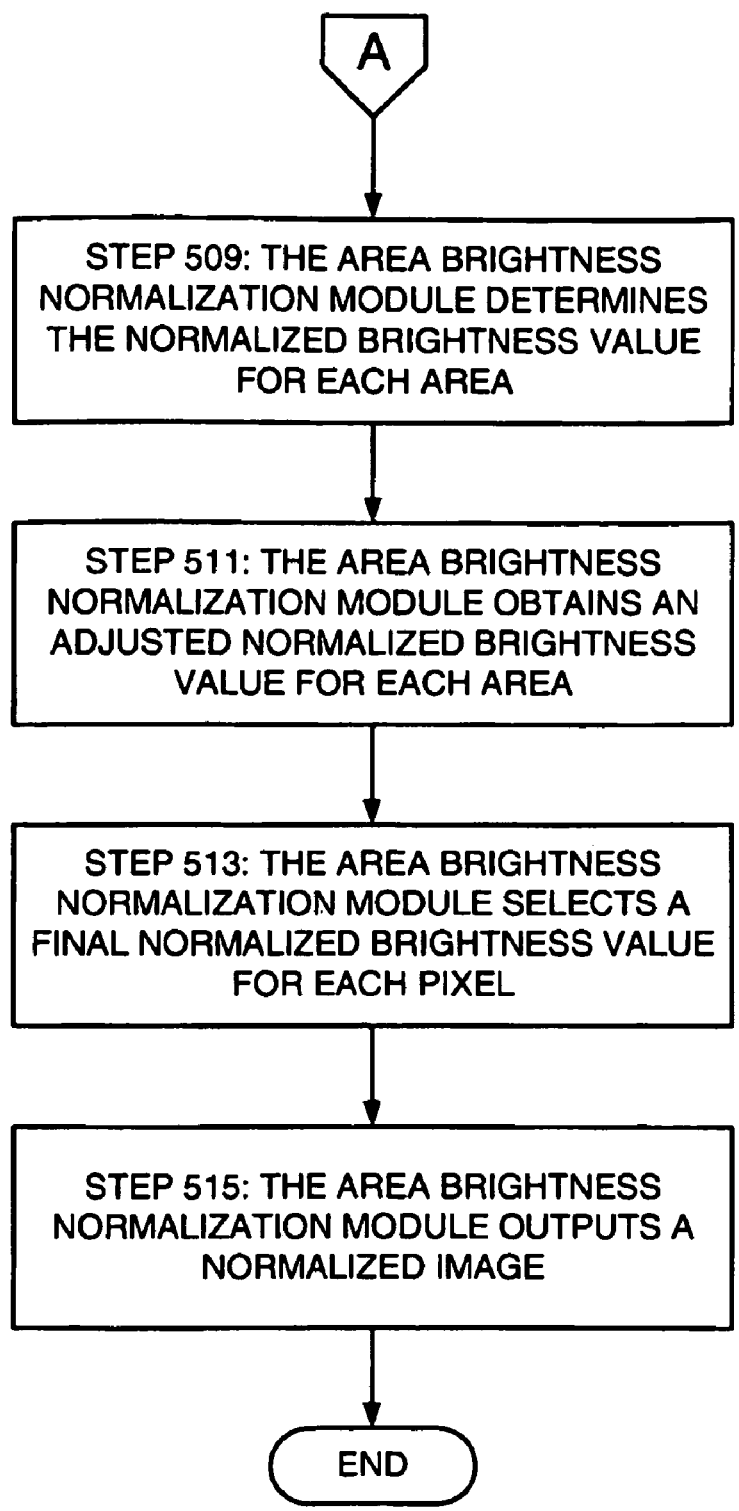
Figure 6:
FIG. 6 illustrates an example of an image that might be processed by the image brightness normalization module illustrated in FIG. 4.

Turning now to FIG. 5A, in step 501 the image segmentation module 401 receives an image from the camera/pen device 101. FIG. 6 illustrates one example of a raw image 601 that might be received from the camera/pen device 101. As seen in this figure, the image 601 has regions that are relatively dark and regions that are relatively light, making it difficult to distinguish features in the image. In the illustrated embodiment, the image is 100×128 pixels (i.e., 100 pixels in the vertical direction and 128 pixels in the horizontal direction). It should be appreciated, however, that the image size will be determined by the camera employed by the camera/pen device 101, and various embodiments of the invention may be employed with images of any size.

Next, in step 503, the image segmentation module 401 segments the image 601 into blocks of areas. In the illustrated example, the image brightness normalization module 105 uses pixels as the areas upon which operations are performed. It should be appreciated, however, that alternately embodiments of the invention may use other units for the area. For example, with larger images, some embodiments of the invention may use groups of four adjacent pixels as the areas upon which operations are performed, while still other embodiments of the invention may use groups of six, eight, nine, sixteen, or any other number of pixels as the areas upon which operations are performed.

Figure 7:
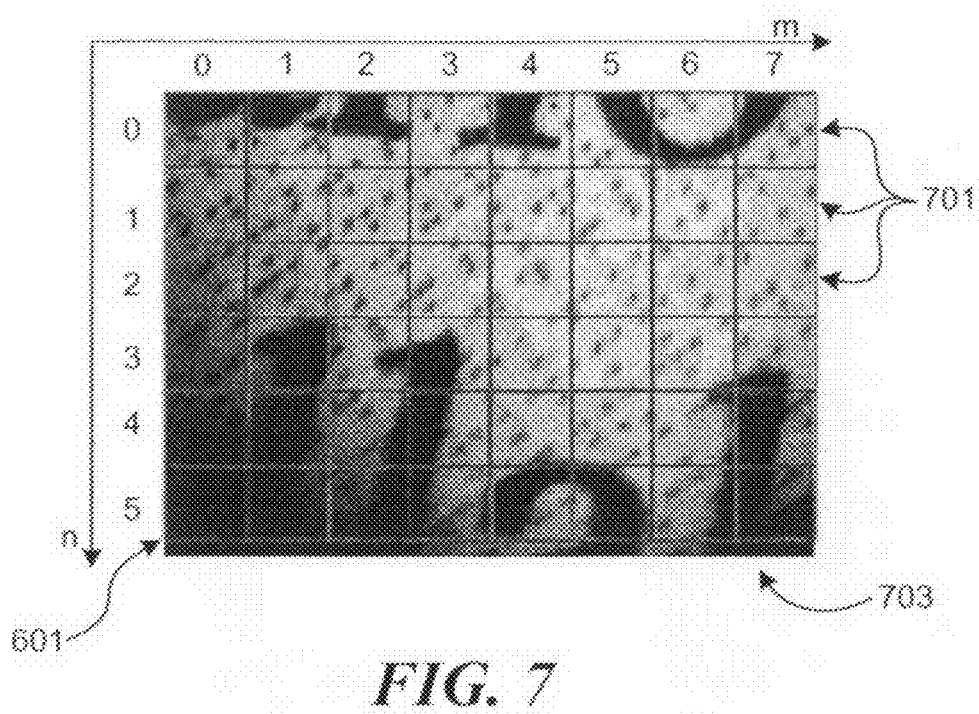
FIG. 7 illustrates the segmentation of the image into blocks starting from the top of the image.

More particularly, the image segmentation module 401 segments the image into blocks starting from the top of the image 601, as shown in FIG. 7. The blocks 701 may conveniently be identified hereafter by coordinate values on indices m, n, as shown in this figure. In the illustrated embodiment, image segmentation module 401 segments the image 601 into blocks 701 of 16 pixels by 16 pixels. It should be appreciated, however, that alternate embodiments of the invention may form the blocks from smaller or larger groups of pixels as desired.

Figure 8:
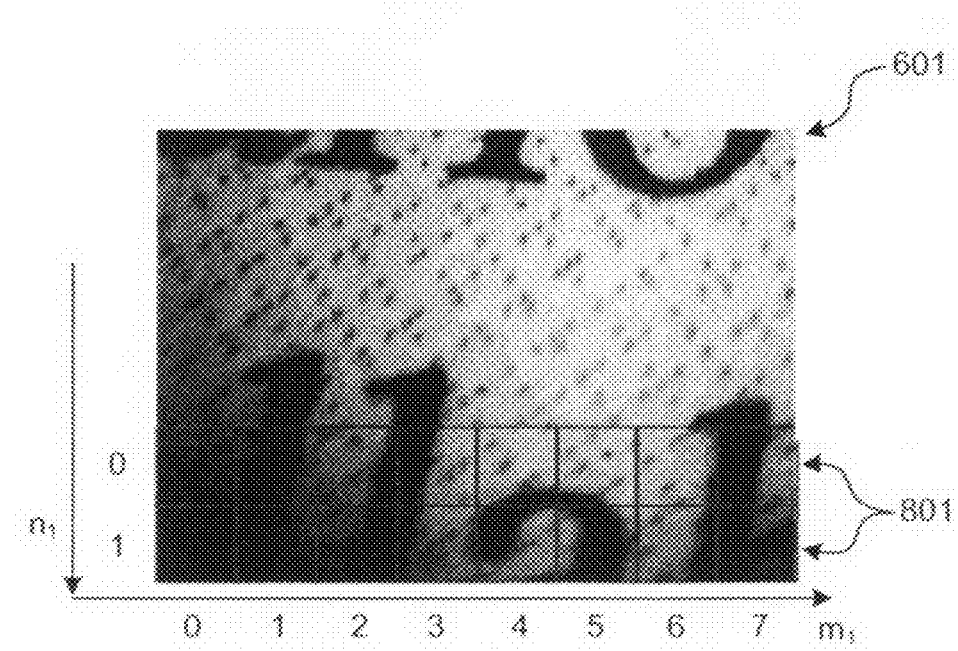
FIG. 8 illustrates the segmentation of the image into blocks starting from the bottom of the image.

Because the image 601 in the illustrated example has a height of 100 pixels and the blocks 701 are formed from 16×16 groups of pixels, there is a small region 703 at the bottom of the image 601 in which the pixels are not segmented into blocks 701. As will be apparent from the detailed explanation provided below, this discrepancy may skew the accuracy of the brightness normalization process. Accordingly, as shown in FIG. 8, the image segmentation module 401 forms a second segment of blocks 801 starting from the bottom of the image 601. The blocks 801 may conveniently be identified hereafter by coordinate values on indices $m_1$, $n_1$, as shown in FIG. 8. As with blocks 701, the blocks 801 are formed from 16×16 groups of pixels.

Next, in step 505, the block brightness estimation module 403 estimates the brightness value for each block 701 and 801. That is, the block brightness estimation module 403 estimates an overall representative brightness value for each block 701 and 801 based upon the gray level of each individual pixel making up the block. In the illustrated example, the block brightness estimation module 403 estimates the brightness value of a block 701 or 801 by creating a histogram of the number of pixels in the block at each gray-level.

Figure 9:
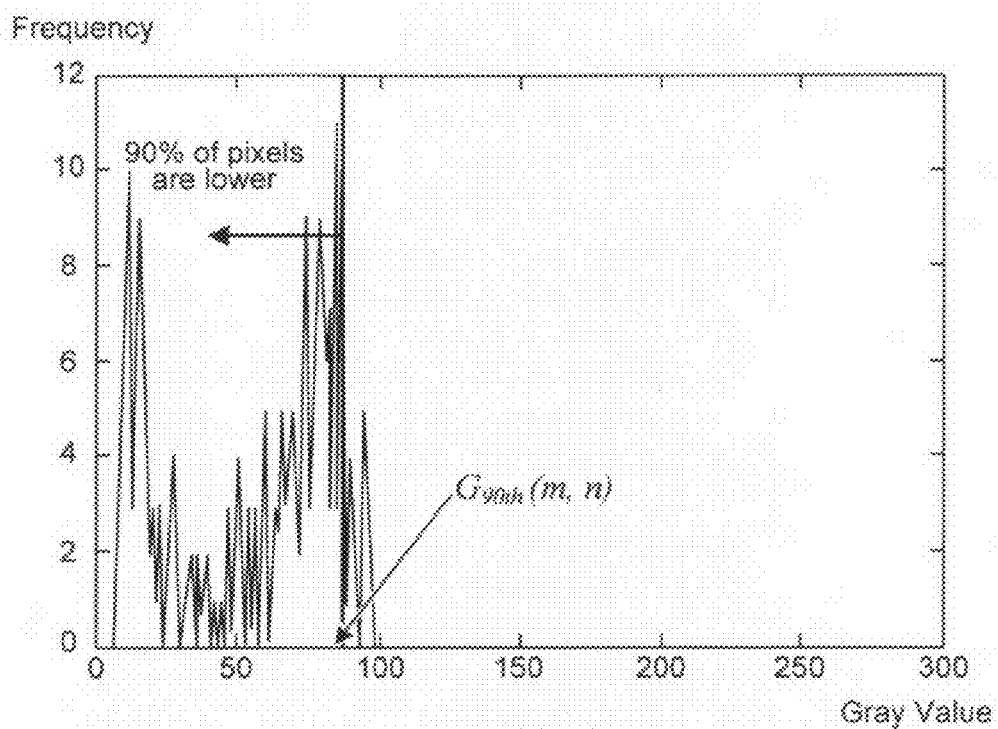
FIG. 9 illustrates one example of a type of histogram that might be employed by various embodiments of the invention to estimate the brightness of a block.

FIG. 9 illustrates one example of a type of histogram that might be employed by various embodiments of the invention to estimate the brightness of a block 701 or 801. As seen in this figure, the X-axis corresponds to the gray levels of the pixels making up the block. The Y-axis then corresponds to the number of pixels that have the gray level. Using this histogram, the block brightness estimation module 403 estimates a representative brightness value for the block. In the illustrated example, the block brightness estimation module 403 identifies the $90^{th}$ percentile gray level to be the estimated brightness value of the block. That is, the block brightness estimation module 403 identifies the gray level $G_{90th}$ at which 90% of the pixels in the block are darter than $G_{90th}$, and employs this value as the brightness value of the block. Of course, other embodiments of the invention may employ alternate percentile criteria for estimating the brightness value of a block as desired. Still further, some embodiments of the invention may employ alternate techniques for determining the overall brightness of each block.

It also should be noted that the illustrated example relates to a black-and-white image. Accordingly, the brightness level corresponds to a gray scale level Various embodiments of the invention alternately may be used to process color images. With these embodiments, the block brightness estimation module 403 will operate based upon the color brightness level of each pixel in the image.

After the block brightness estimation module 403 has estimated the brightness value for each block 701 and 801, the area brightness distribution determination module 405 performs a bilinear fitting of the brightness distribution for each area in step 507. As previously noted, there is a region 703 at the bottom of image 601 that has not been segmented into any of the blocks 701. The brightness distribution values for the pixels in these regions thus are determined using the blocks 801 rather than the blocks 701. Accordingly, the brightness distribution values are determined in a two-step process. The pixels that are primarily within blocks 701 (i.e., the pixels having a y coordinate value of 0-87 are determined using the estimated brightness values of the blocks 701, while the pixels that are primarily within blocks 801 (i.e., the pixels having a y coordinate value of 88-99) are determined using the estimated brightness values of the blocks 801.

With the illustrated embodiment, for each pixel (x, y), where y=0, 1, ... 87, the brightness distribution value of that pixel D(x,y) is estimated by using bilinear fitting method as:

$$D(x,y)=(1-\eta_y)\cdot[(1-\eta_x)\cdot I_{B(m,n)}+\eta_x\cdot I_{B(m+1,n)}]+\eta_y\cdot[(1-\eta_x)\cdot I_{B(m,n+1)}+\eta_x\cdot I_{B(m+1,n+1)}]$$

where $I_{B(m,n)} = G_{90th}$ (m,n), s is the size of a block (in the illustrated example, $$s = 16), m = \min\left(\max\left[\text{int}\left(\frac{x-s/2}{s}\right), 0\right], 6\right),$$

$$n = \min\left(\max\left[\text{int}\frac{y-s/2}{s}\right], 0\right], 4\right), x_1 = ms + \frac{s}{2}, x_2 = (m+1)s + \frac{s}{2},$$

$$y_1 = ns + \frac{s}{2}, y_2 = (n+1)s + \frac{s}{2}, \eta_x = \frac{x-x_1}{x_2-x_1}, \text{ and } \eta_y = \frac{y-y_1}{y_2-y_1}.$$

It should be noted that int(x) is a function that returns the largest integer less than or equal to x. For example, int(1.8)=1, int(−1.8)=−2.

Figure 10:
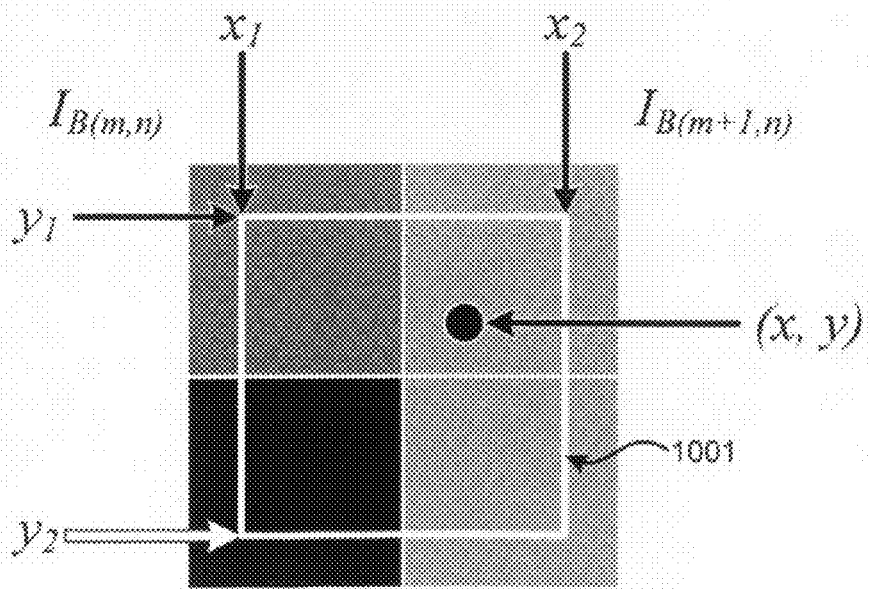
FIG. 10 illustrates the gray level information obtained using the operation described in FIGS. 5A and 5B.
Figure 11:
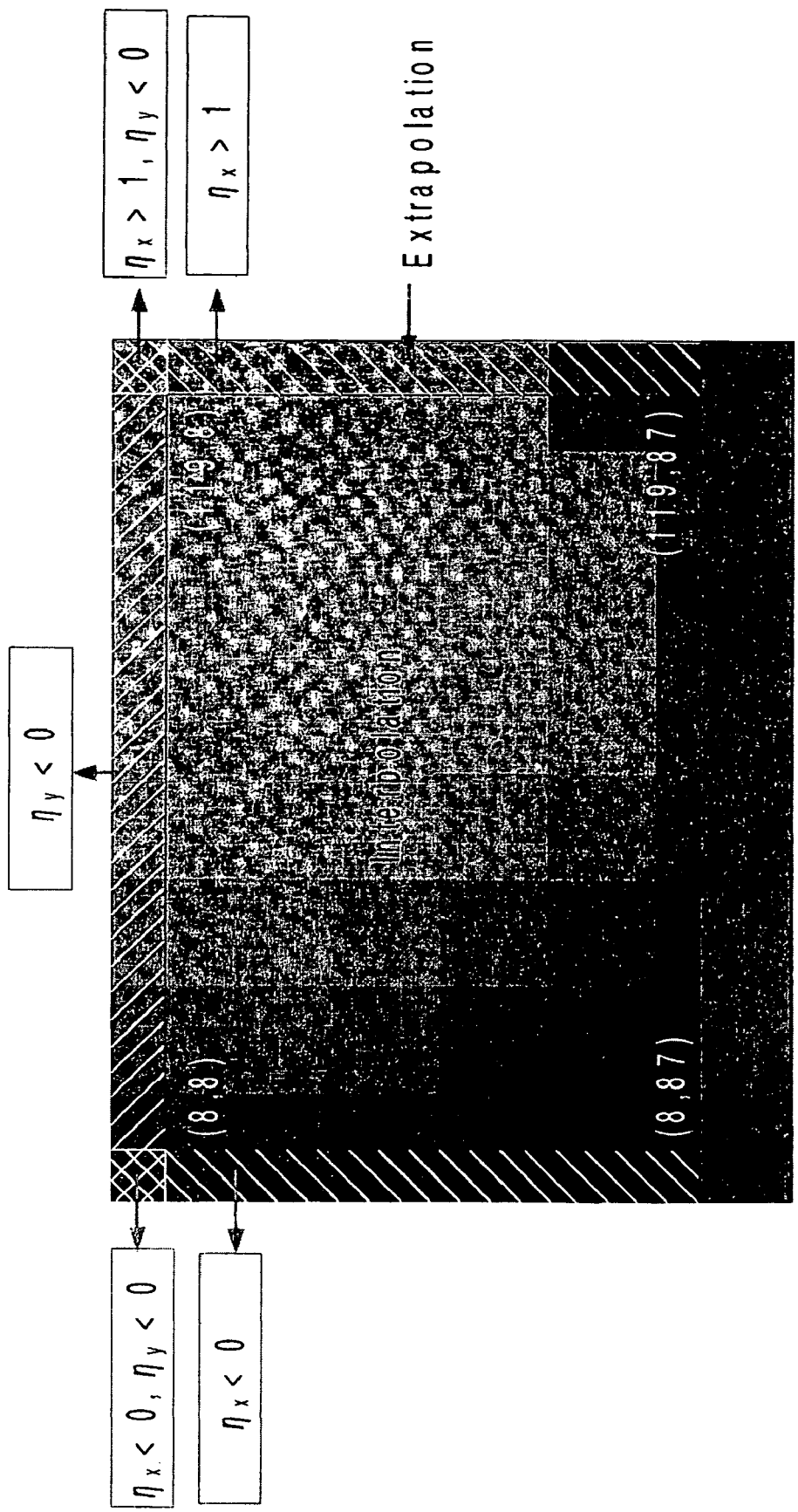
FIGS. 11 and 12 illustrate the different regions for which interpolation is used to determine the brightness value information according to various embodiments of the invention.
Figure 12:
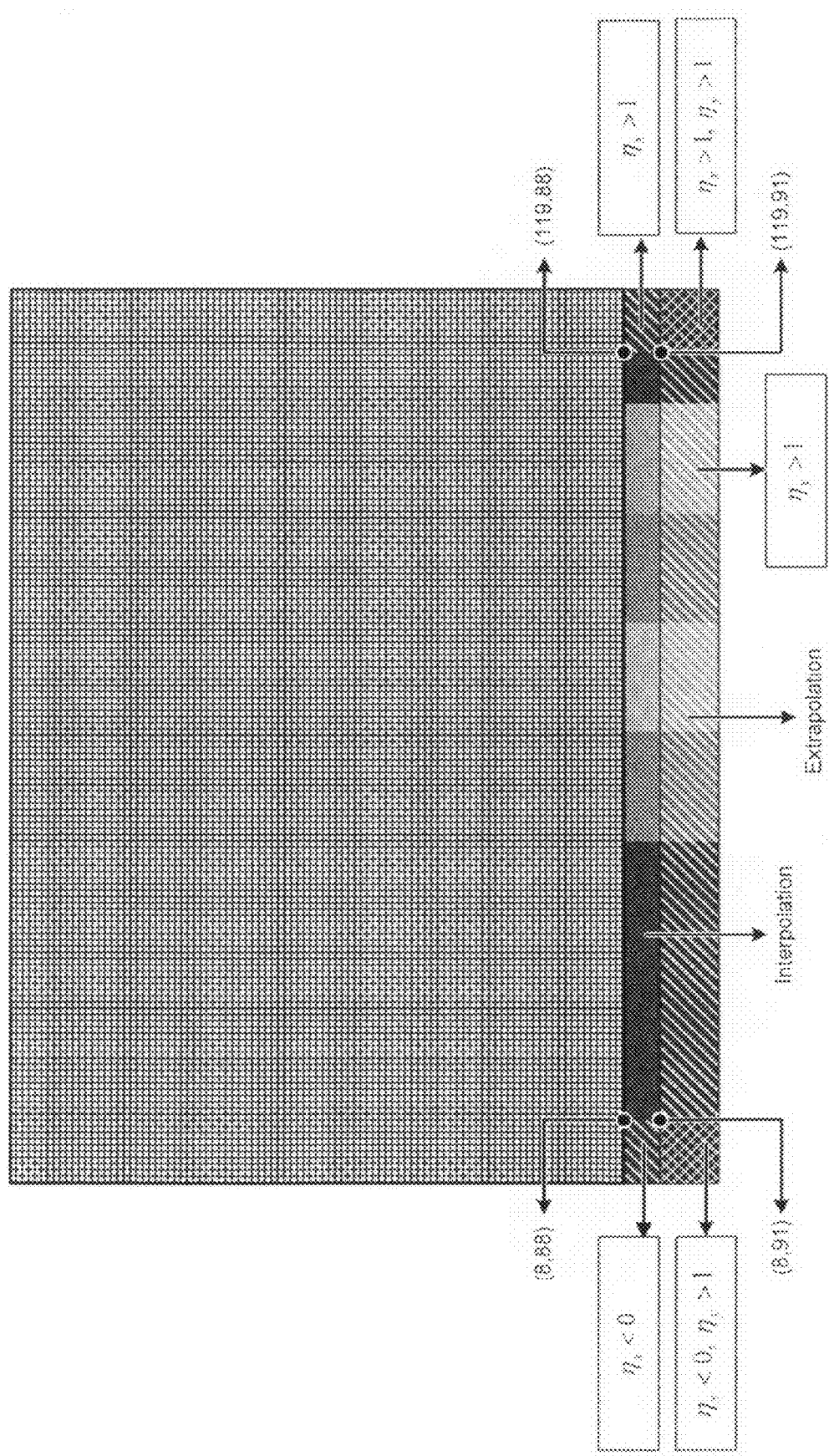
Figure 13:
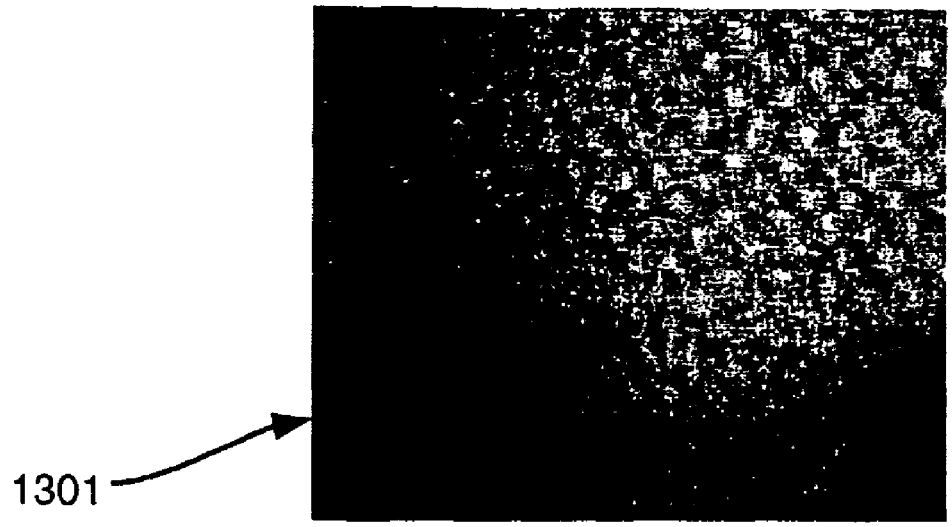
FIG. 13 illustrates the brightness distribution values obtained for the image shown in FIG. 6 using the operation described in FIGS. 5A and 5B.

The brightness value information employed to determine the brightness distribution value of a pixel using this process is graphically illustrated in FIG. 10. As will be appreciated from this image, some pixels will fall outside of any region 1001 that can be equally distributed among four adjacent blocks 701. For example, in the illustrated example, pixels having an x coordinate value of 0-7 or 120-127 and pixels having a y coordinate value of 0-7 will fall outside of any region 1001 that can be equally distributed among four adjacent blocks 701. For these pixels in border regions, the above equations may still be applied to determine their brightness distribution values, except that extrapolation will be used instead of interpolation. The different regions are graphically illustrated in FIG. 11.

Similarly, for each pixel (x,y), where y=88, 89, ... 99, the brightness distribution value of that pixel D(x,y) is estimated as:

$$D(x,y)=(1-\eta_y)\cdot[(1-\eta_x)\cdot I_{B(m_1,n_1)}+\eta_x\cdot I_{B(m_1+1,n_1)}]+\eta_y\cdot[(1-\eta_x)\cdot I_{B(m_1,n_1+1)}+\eta_x\cdot I_{B(m_1+1,n_1+1)}]$$

where $I_{B(m_1,n_1)} = G_{90th}$ (m$_1$, n$_1$) s is the size of a block (in our implementation, s=16), $$m_1 = \min\left(\max\left[\text{int}\left(\frac{x-s/2}{s}\right), 0\right], 6\right), n_1 = 0, x_1 = m_1 s + \frac{s}{2},$$

$$x_2 = (m_1+1)s + \frac{s}{2}, y_1 = \text{height} - s - \frac{s}{2} - 1,$$

$$y_2 = \text{height} - \frac{s}{2} - 1, \eta_x = \frac{x-x_1}{x_2-x_1}, \text{ and } \eta_y = \frac{y-y_1}{y_2-y_1} \cdot \text{height}.$$

is the height of the image sensor. In the illustrated example, height=100.

Again, some pixels will fall along the image border outside of any region that can be equally distributed among four adjacent blocks 801. For these pixels in border regions, the above equations may still be applied to determine their brightness distribution values, except that extrapolation will be used instead of interpolation. The different regions are graphically illustrated in FIG. 12. The brightness distribution values 1301 for the entire image 601 are then shown in FIG. 13.

Once the area brightness distribution determination module 405 has determined the brightness distribution value for each area, the area brightness normalization module 407 determines the normalized gray level value for each area in step 509. More particularly, the area brightness normalization module 407 determines the normalized gray level value for each area by dividing the area's original gray level value for the brightness distribution value for that area. Next, in step 511, the area brightness normalization module 407 obtains an adjusted normalized gray level value for each area by multiplying the normalized gray level value for each area by a uniform brightness level G$_0$. In the illustrated example, the value of uniform brightness level G$_0$ is 200, but alternate embodiments of the invention may employ different values for the uniform brightness level G$_0$. The uniform brightness level G$_0$ represents the supposed gray level of the captured image in a blank area for an ideal situation (i.e., a uniform illumination with an ideal image sensor). Thus, in an ideal case, the gray level of all pixels of a captured image from a blank area should be equal to the uniform brightness level G$_0$.

Figure 14:
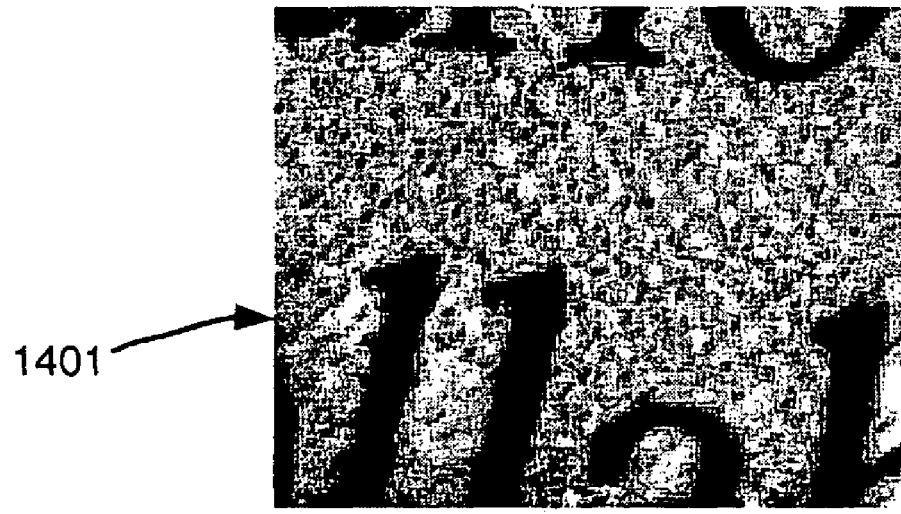
FIG. 14 illustrates how the image shown in FIG. 6 appears after being processed using the operation described in FIGS. 5A and 5B.

Lastly in step 513, the area brightness normalization module 407 selects a final normalized gray level value for each pixel by assigning each pixel a new gray level value that is the lesser of its adjusted normalized gray level value and the maximum gray level value. Thus, with the illustrated example, the final normalized gray level value for each pixel is determined as a gray level G(x,y) where:

$$G(x, y) = \min\left(G_0 \cdot \frac{G(x, y)}{D(x, y)}, 255\right)$$

where G$_0$=200 and 255 is the maximum gray level (i.e., white). Then, in step 515, area brightness normalization module 407 outputs a normalized image using the final normalized gray level value for each pixel. FIG. 14 illustrates how the image 601 appears as image 1401 after being processed in the manner described in detail above.

Pattern Determination

Figure 15:
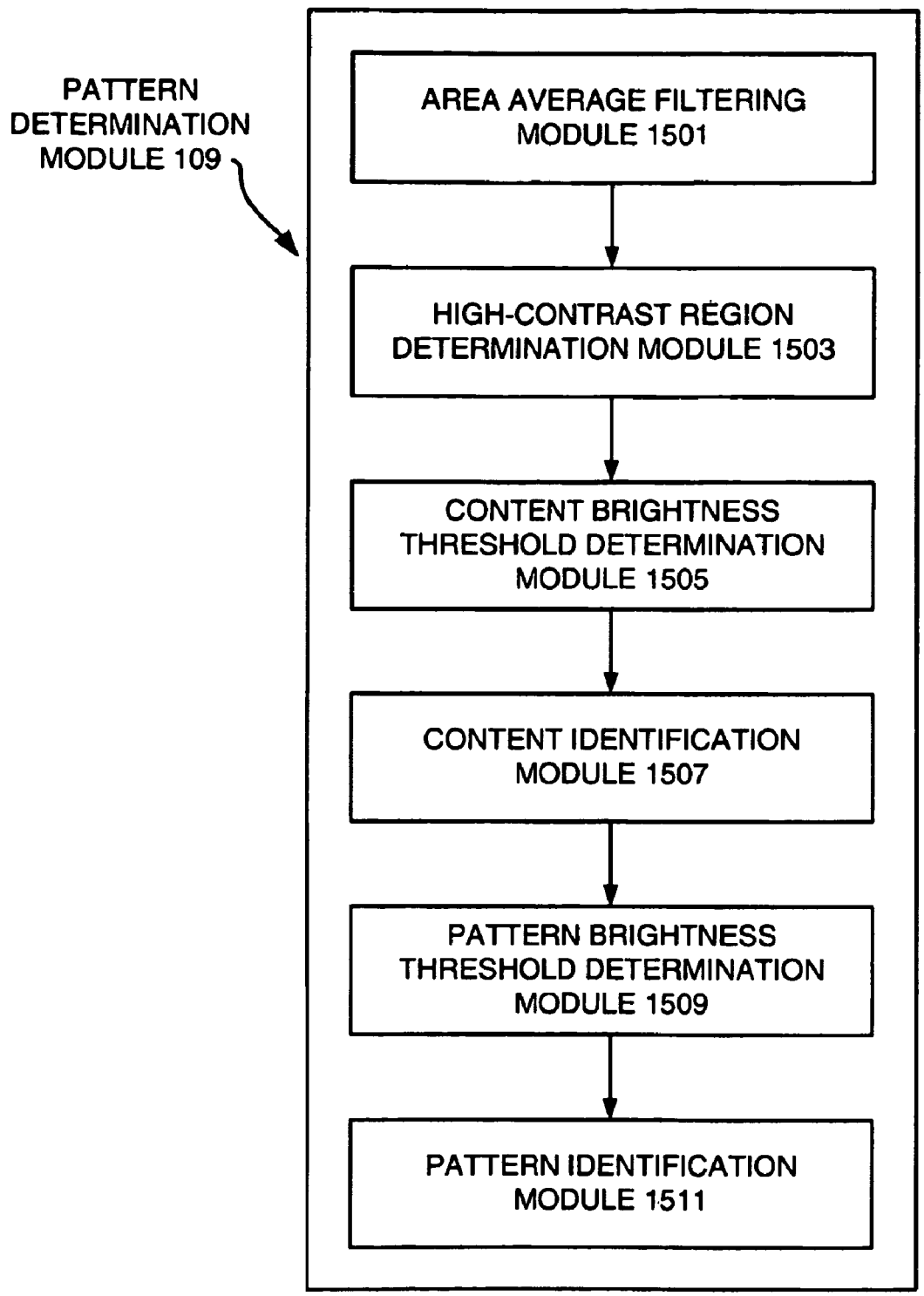
FIG. 15 illustrates a pattern determination system for distinguishing an information pattern from content in a document image according to various embodiments of the invention.
Figure 16A:
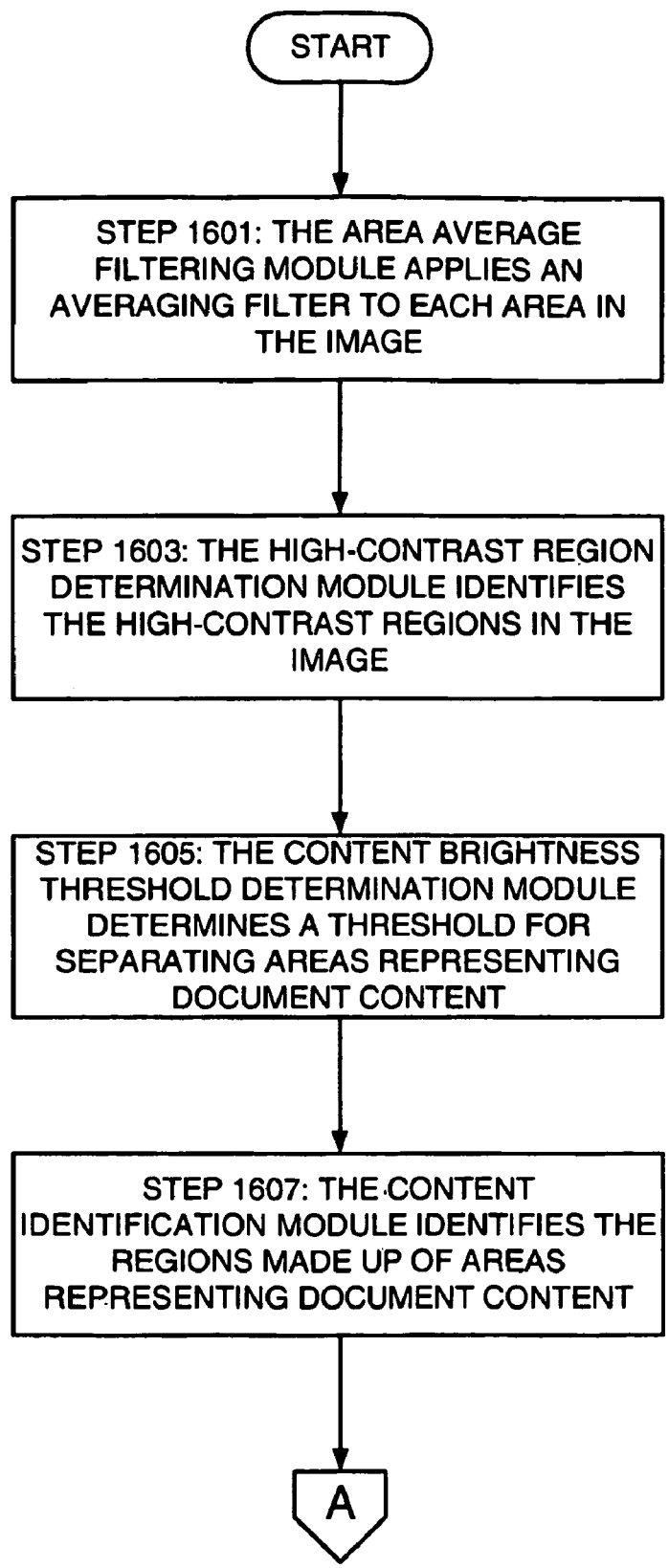
FIGS. 16A and 16B illustrate a flowchart describing the operation of the pattern determination system illustrated in FIG. 15.
Figure 16B:
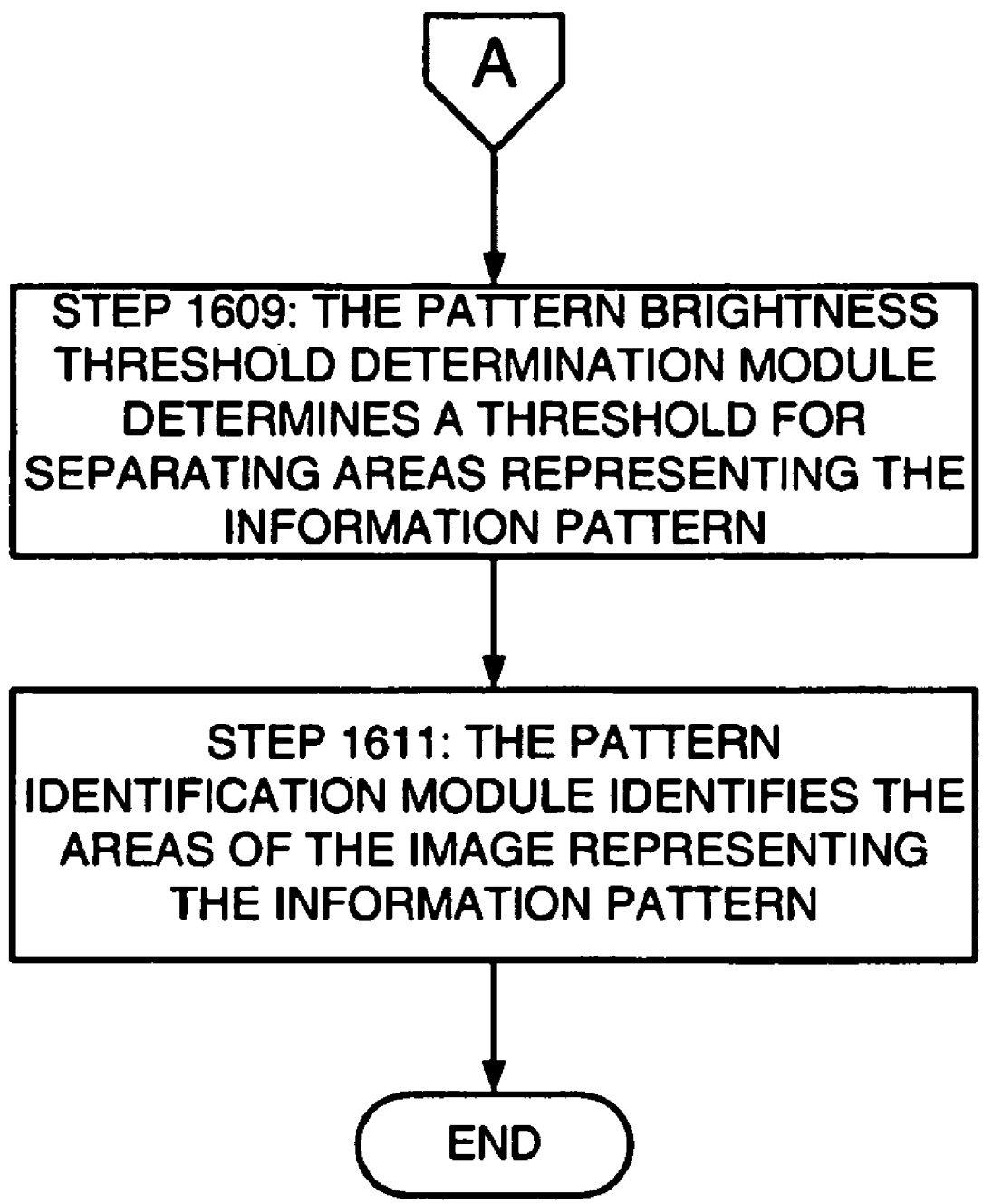

After the image brightness normalization module 105 normalizes the image captured by the pen/camera device 101, the pattern determination module 109 distinguishes the areas of the normalized image that represent content in a document from the areas of the normalized image that represent the information pattern. FIG. 15 illustrates a pattern determination system for distinguishing an information pattern from content in a document image. As seen in this figure, the pattern determination module 109 includes an area average filtering module 1501 and a high-contrast region determination module 1503. As will be discussed in greater detail below, the area average filtering module 1501 applies an averaging filter to the brightness value of each area in the image. The high-contrast region determination module 1503 then identifies high-contrast regions in the image.

The pattern determination module 109 also includes a content brightness threshold determination module 1505, a content identification module 1507, a pattern brightness threshold determination module 1509, and a pattern identification module 1511. As will be discussed in greater detail below, for a black-and-white image, the content brightness threshold determination module 1505 determines a first gray level value threshold that the content identification module 1507 then uses to identify areas of the image representing content. Similarly, for a black-and-white image, the pattern brightness threshold determination module 1509 determines a second gray level value threshold that the pattern identification module 1511 uses to identify areas of the image that represent an information pattern.

The pattern determination module 109 takes advantage of the fact that, in an image of a document containing both content (e.g., printed text, pictures, etc.) and an information pattern, the information pattern, document content and document background tend to have different brightness levels. Thus, with a black-and-white image, the areas representing the information pattern, document content and document background will typically have different gray levels, with the areas representing the document content being the darkest, the areas representing the information pattern being the second darkest, and the areas representing the document background being the least dark. Thus, the pattern determination module 109 can distinguish the three different areas by thresholding.

In order to more efficiently determine the appropriate thresholds to separate the three brightness levels, the pattern determination module 109 first identifies high-contrast regions. For black-and-white images, these are regions that have a relatively large difference in gray levels between adjacent image areas (e.g., such as pixels). Thus, the threshold for segmenting the areas representing document content from other areas in the image can be more effectively identified in the high-contrast areas. Once the threshold is found, regions that are darker than the threshold are identified as representing document content. These regions can then be marked as being made up of areas representing content. For example, the areas in a content region may be assigned a value of 1 in a document content mask.

After the regions representing document content have been identified, the brightness values of the remaining areas can then be analyzed. Those regions having an gray level value above a second threshold are then identified as representing the information pattern. These regions can then be marked as being made up of areas representing the information pattern. For example, the areas in a pattern region may be assigned a value of 1 in an information pattern mask. Thus distinguished from the rest of the image, the areas representing the information pattern can be more accurately analyzed by the pattern analysis module 111.

The operation of the pattern determination module 109 will now be described with reference to FIGS. 16A-20. More particularly, the operation of the pattern determination module 109 will be discussed as applied to the normalized image 1401. Thus, in this example, the image is a black-and-white image. It should be appreciated, however, that various embodiments of the invention may be employed to process color images. As previously noted with respect to the image brightness normalization module 105, if the image is a color image, then the pattern determination module 105 will operate using color brightness levels rather than gray levels. Also, the illustrated example of the pattern determination module 109 uses pixels as the area unit on which it performs operations. It should be noted, however, that other examples of the invention may operate on other areas, such as groups of multiple pixels, as previously described with respect to the image brightness normalization module 105.

Initially, high contrast areas are identified to more efficiently locate regions that represent content, as previously noted. Because the regions representing the information pattern may also have a large difference in brightness levels, however, the image areas are first filtered to reduce the brightness level value difference in the regions surrounding the information pattern. More particularly, in step 1601, the area average filtering module 1501 applies an averaging filter to each area in the image. For black-and-white images, this filtering operation replaces the gray level of each pixel by an average of the gray levels of the surrounding eight pixels and the gray level of the pixel itself. That is, for every pixel (x,y)

$$G_{average}(x, y) = \frac{1}{9}\sum_{i=-1}^{1}\sum_{j=-1}^{1} G(x+i, y+j)$$

where G(x,y) is the gray level of pixel (x,y). It should be note that G(x,y) is the brightness-normalized gray level.

Figure 17:
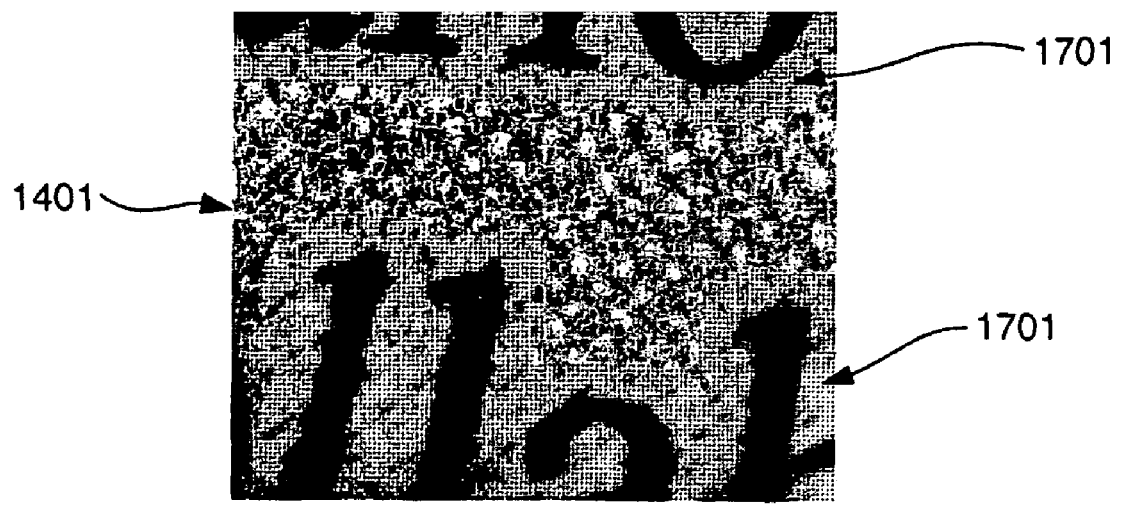
FIG. 17 illustrates the high-contrast areas identified using the operation described in FIGS. 16A and 16B.

Next, in step 1603, the high-contrast region determination module 1503 identifies the high-contrast regions in the image using the averaged gray level of each pixel. In particular, for each pixel, the high-contrast region determination module 1503 identifies the maximum and the minimum averaged gray level values in the 17×17 pixel neighborhood surrounding the pixel. That is, for every pixel (x,y), $G_{max}(x,y)=\max(G_{average}(p,q)|\max(x-8,0)\leq p\leq\min(x+8,127),\max(y-8,0)\leq q\leq\min(y+8,127))$ $G_{min}(x,y)=\min(G_{average}(p,q)|\max(x-8,0)\leq p\leq\min(x+8,127),\max(y-8,0)\leq q\leq\min(y+8,127))$ It should be appreciated that the determination described above is based upon the specific number of pixels of the image used in the illustrated example. A similar determination, using different pixels coordinate values, would be employed for embodiments of the invention used to process images of different sizes. Next, the high-contrast region determination module 1503 defines a high-contrast region as High Contrast Region=
 $\{(x,y)|[G_{max}(x,y)-G_{min}(x,y)]>D_0\}$ where $D_0$ is a predetermined threshold. The value of $D_0$ is determined empirically. In the illustrated example, $D_0$=140, but it should be appreciated, however, that other embodiments of the invention may employ different threshold values depending, e.g., upon the contrast quality provided by the camera/pen device 101. FIG. 17 illustrates the high-contrast areas 1701 identified in image 1401 using the above-described technique.

Figure 18:
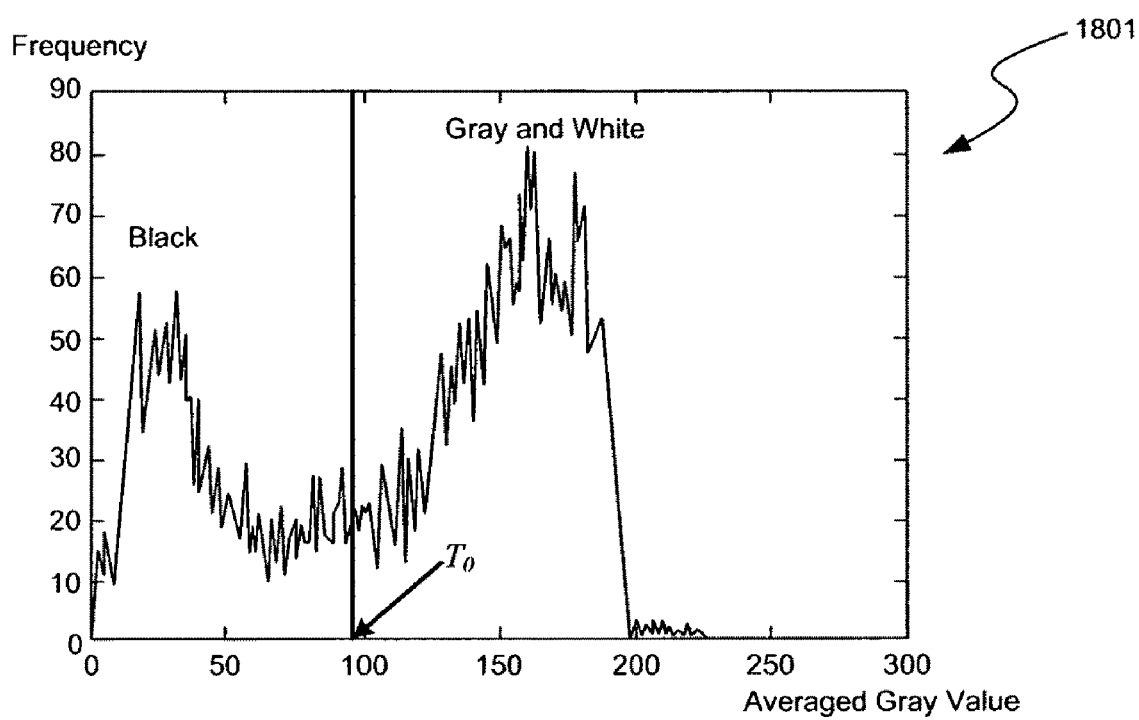
FIG. 18 illustrate an example of a gray-level histogram used to determine a content brightness threshold according to various examples of the invention.

Next, in step 1605, the content brightness threshold determination module 1505 determines a threshold for separating areas representing document content from the other areas of the image. To determine the threshold, the content brightness threshold determination module 1505 creates a gray-level histogram for the high-contrast regions. An example of such a histogram 1801 is illustrated in FIG. 18. As seen in this figure, the X-axis of this histogram 1801 corresponds to the averaged gray levels of the pixels in the high-contrast regions. The Y-axis then corresponds to the number of pixels at that gray level. From the histogram, a threshold $T_0$ for separating the darker pixels from gray and white pixels can be identified. Any suitable technique for selecting a threshold to distinguish darker pixels from gray and white pixels may be employed. One such technique for obtaining the threshold $T_0$ is described, for example, in N. Otsu, "A Threshold Selection Method from Gray-Level Histogram," *IEEE Transactions on Systems, Man, and Cybernetics,* 9(1), (1979), pp. 62-66, which is incorporated entirely herein by reference.

Once the threshold value $T_0$ has been determined, the content identification module 1507 uses the threshold $T_0$ identify the areas of the image representing content in step 1607. First, given $T_0$, pixels in the image that are darker than $T_0$ are identified as images representing the document content and are assigned a value of 1 in a document content mask. Thus, for every pixel (x,y), if $G_{average}(x,y)\leq T_0,$ then Document Content Mask (x,y)=1, else Document Content Mask (x,y)=0.

After the document content mask has been created, those regions $R_t$, are identified, where t=1, 2, ... T, of pixels $(x_i, y_i)$ as follows:

$$R_t = \{(x,y) | \text{Document Content Mask } (x_i, y_i) = 1, (x_i, y_i) \text{ are neighbors}\}.$$

Figure 19:
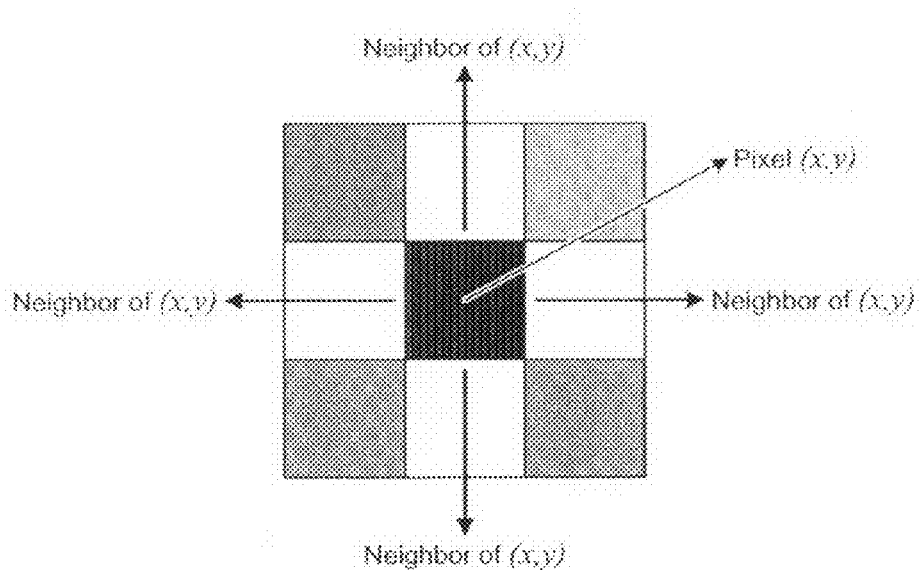
FIG. 19 illustrates a relationship between neighboring pixels.
Figure 20:
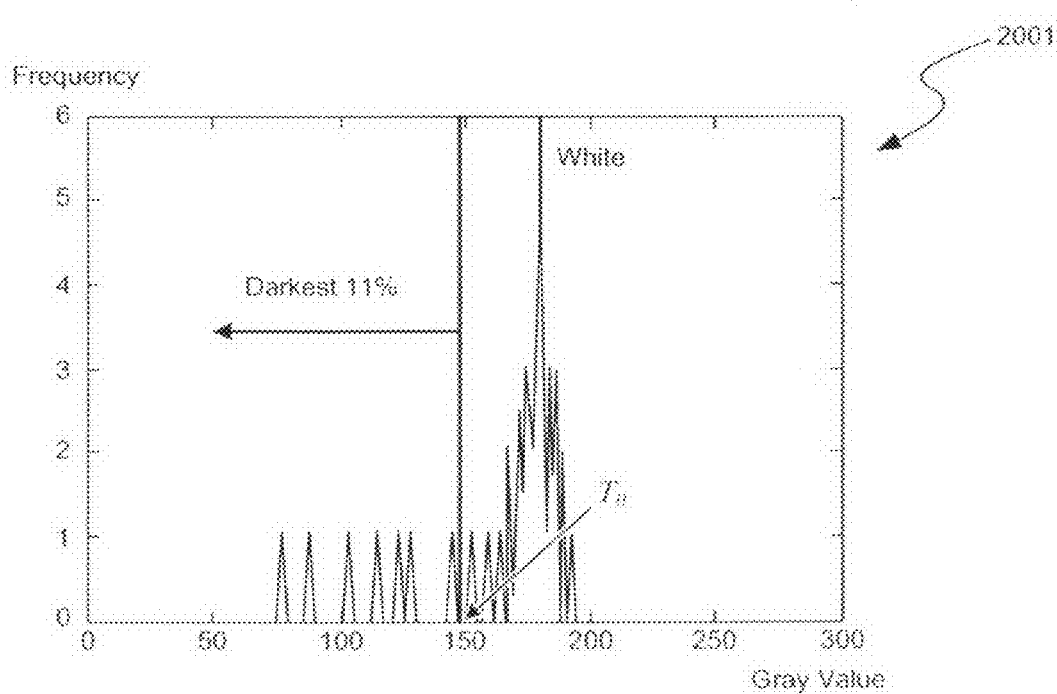
FIG. 20 illustrates an image that has been processed using the operation described in FIGS. 5A, 5B, 16A and 16B.

Two pixels are neighbors if they are directly below, above or next to each other, as shown in FIG. 19. Thus, the mask identifies regions $R_t$ of neighboring areas that represent content. In the illustrated example, if a region $R_t$ contains fewer than 20 pixels, it is removed from the document content mask. That is, for each pixel $(x_t, y_t) \in R_t$, Document Content Mask $(x_t, y_t) = 0$. This eliminates regions that are too small to actually represent document content.

Next, in step 1609, the pattern brightness threshold determination module 1509 determines a second threshold for separating the areas representing the information pattern from the remaining areas of the image (i.e., the non-content areas). Initially, the pattern brightness threshold determination module 1509 segments the image into 8×8 pixel blocks. For black-and-white images, the pattern brightness threshold determination module 1509 then creates a gray-level value histogram for each 8×8 pixel block, such as the histogram 2001 in FIG. 20. As seen in this figure, the X-axis corresponds to the brightness-normalized gray levels of non-document content pixels in the block, i.e. pixels for which Document Content Mask (x,y)=0. The Y-axis then corresponds to the number of non-document content pixels at that gray level.

From the histogram, a second threshold $T_0$ is identified to distinguish information pattern areas from the remaining background areas. The second threshold $T_0$ is empirically chosen, based on the size of the camera sensor in the pen/camera device 101 and the size of code symbol, to be approximately equal to the ratio of black dots in the code symbol. In the illustrated example, the code symbol is the 8-a-16 code symbol illustrated in FIG. 3C. Thus, the second threshold $T_0$ is selected such that 11% of the pixels are darker than $T_0$.

Once the second threshold $T_0$ is determined, the pattern identification module 1511 identifies the areas of the image representing the information pattern in step 1611. More particularly, for every pixel (x,y) in a block, if Document Content Mask (x,y)=0 and $G(x,y) \leq T_0$, then the pattern identification module 1511 assigns Pattern Mask (x,y)=1, else, Pattern Mask (x,y)=0.

For the bottom pixels (i.e., the 4×128 pixel region along the bottom border of the image), the 4×128 pixel area directly above may be used to form 8×8 pixel blocks. Within each of these bottom blocks, the second threshold is determined using the same method described in detail above. Only those pixels in the bottom region are compared against the threshold, however, as the pixels "borrowed" from the region directly above will already have been analyzed using the second threshold established for their original blocks. Those bottom pixels that are darker than the threshold are identified as representing the information pattern.

After all of the pixels having a gray level below their respective second threshold values have been identified, those identified pixels that are adjacent to pixels representing document content are removed from the information pattern mask. That is, for every pixel (x,y), if Pattern Mask (x,y)=1 and a pixel among 8 neighbors of (x,y) has been identified as representing document content (i.e., there exists i, j, where i=−1, 0, 1, j=−1, 0, 1, such that Document Content Mask (x+i,y+j)=1), then Pattern Mask (x,y)=0. In this manner, the pixels making up the information pattern can be accurately distinguished from the other pixels in the image. Further, the image preprocessing system 103 according to various examples of the invention can output a new image that clearly distinguishes an information pattern from the remainder of the image.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method performed by a computing device having a memory and a processor for identifying an information pattern containing embedded position information in an image of a document, the method comprising:
    identifying high-contrast regions in an image of a document;
    obtaining a first threshold brightness value for distinguishing areas of the image that represent content;
    analyzing each area in the image to determine if a brightness value for the area is below the first threshold;
    designating areas in the high-contrast regions having a brightness value below the first threshold as areas representing content so as to identify content areas and non-content areas;
    obtaining a second threshold brightness value for distinguishing areas of the image that represent an information pattern;
    analyzing each non-content area in the image to determine if a brightness value for the area is below the second threshold; and
    designating non-content areas having a brightness value below the second threshold as pattern areas representing the information pattern
    wherein the information pattern contains embedded position information and is used to determine the position of the image relative to the document and
    wherein the identifying, analyzing, and designating are performed by the processor executing instructions stored in the memory.

2. The method recited in claim 1, further comprising applying an average filter to each area of the image before identifying high-contrast areas in the image.

3. The method recited in claim 1, further comprising organizing neighboring content areas into regions, and
    if a region has fewer than a specified number of areas, designating each of the areas in the region as non-content areas.

4. The method recited in claim 1, further comprising:
    analyzing each pattern area to determine if the pattern area is adjacent to a content area; and
    if the pattern area is adjacent to a content area, changing the designation of the pattern area to a blank area.

5. The method recited in claim 1, wherein
    the image is a black-and-white image; and
    the brightness values are gray level values 6. The method recited in claim 1, wherein
    the image is a color image, and
    the brightness level values are color brightness values.

7. A system, having a memory and a processor, comprising:
    a module that identifies high-contrast regions in an image of a document;
    a module that obtains a first threshold brightness value for distinguishing areas of the image that represent content;
    a module that analyzes each area in the image to determine if a brightness value for the area is below the first threshold;

a module that designates areas in the high-contrast regions having a brightness value below the first threshold as areas representing content so as to identify content areas and non-content areas;

a module that obtains a second threshold brightness value for distinguishing areas of the image that represent an information pattern;

a module that analyzes each non-content area in the image to determine if a brightness value for the area is below the second threshold; and a module that designates non-content areas having a brightness value below the second threshold as pattern areas representing the information pattern wherein at least one of the modules comprises computer-executable instructions stored in the memory for execution by the computer.

8. The system of claim 7, further comprising:

a module that applies an average filter to each area of the image before the high-contrast areas in the image are identified.

9. The system of claim 7, further comprising:

a module that organizes neighboring content areas into regions and, if a region has fewer than a specified number of areas, designates each of the areas in the region as non-content areas.

10. The system of claim 7, further comprising:

a module that analyzes each pattern area to determine if the pattern area is adjacent to a content area; and a module that, if the pattern area is adjacent to a content area, changes the designation of the pattern area to a blank area.

11. The system of claim 7, wherein the image is a black-and-white image; and the brightness values are gray level values

12. The system of claim 7, wherein the image is a color image, and the brightness level values are color brightness values.

* * * * *